(12) United States Patent
Oteri et al.

(10) Patent No.: US 11,943,802 B2
(45) Date of Patent: Mar. 26, 2024

(54) TECHNIQUES FOR NODE DIRECTED UPLINK (UL) CANCELLATION AND CHANNEL ACCESS IN UNLICENSED BANDS

(71) Applicant: Apple Inc., Cupertino, CA (US)

(72) Inventors: Oghenekome Oteri, San Diego, CA (US); Weidong Yang, San Diego, CA (US); Sigen Ye, Whitehouse Station, NJ (US); Haitong Sun, Cupertino, CA (US); Chunhai Yao, Beijing (CN); Yushu Zhang, Beijing (CN); Dawei Zhang, Saratoga, CA (US); Chunxuan Ye, San Diego, CA (US); Wei Zeng, Saratoga, CA (US); Hong He, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/593,750

(22) PCT Filed: Aug. 5, 2020

(86) PCT No.: PCT/CN2020/107024
§ 371 (c)(1),
(2) Date: Sep. 23, 2021

(87) PCT Pub. No.: WO2022/027290
PCT Pub. Date: Feb. 10, 2022

(65) Prior Publication Data
US 2023/0156771 A1 May 18, 2023

(51) Int. Cl.
*H04W 72/56* (2023.01)
*H04W 16/14* (2009.01)
(Continued)

(52) U.S. Cl.
CPC ........... *H04W 72/56* (2023.01); *H04W 16/14* (2013.01); *H04W 72/1268* (2013.01); *H04W 74/0808* (2013.01)

(58) Field of Classification Search
CPC . H04W 72/56; H04W 16/14; H04W 72/1268; H04W 74/0808; H04W 72/0446;
(Continued)

(56) References Cited

U.S. PATENT DOCUMENTS

| 11,765,750 B2 * | 9/2023 | Luo | H04W 72/21 |
| | | | 370/330 |
| 2020/0106168 A1 | 4/2020 | Sami | |
| 2021/0105803 A1 * | 4/2021 | Yang | H04L 27/2601 |

FOREIGN PATENT DOCUMENTS

| CN | 110366246 A | 10/2019 |
| CN | 110912665 A | 3/2020 |

(Continued)

OTHER PUBLICATIONS

Apple Inc., "Remaining Issues on Enhanced Inter UE Tx prioritization/multiplexing," 3GPP TSG RAN WG1 #99, R1-1912820, Nov. 22, 2019 (Nov. 22, 2019).
(Continued)

*Primary Examiner* — Vinncelas Louis
(74) *Attorney, Agent, or Firm* — Blank Rome LLP

(57) ABSTRACT

A technique for wireless communications in a wireless system including: receiving, from a first user device, cancellation capability information, receiving, from a second user device, unlicensed frequency transmission capability information, receiving, from the first user device, an uplink transmission over an unlicensed frequency band, determining, a need for a higher priority uplink transmission by the second user device, scheduling an uplink cancellation time for the first user device based on the cancellation capability information and unlicensed frequency transmission capabil-
(Continued)

ity information, scheduling an uplink transmission time for the second user device based on the cancellation capability information and unlicensed frequency transmission capability information, transmitting an uplink cancellation request to the first user device based on the scheduled uplink cancellation time, and transmitting an uplink transmission time for the higher priority uplink transmission to the second user device based on the scheduled uplink transmission time.

20 Claims, 17 Drawing Sheets

(51) Int. Cl.
*H04W 72/1268* (2023.01)
*H04W 74/0808* (2024.01)

(58) Field of Classification Search
CPC ..... H04W 72/23; H04W 72/21; H04W 84/02; H04L 27/2601
See application file for complete search history.

(56) References Cited

FOREIGN PATENT DOCUMENTS

| WO | WO-2015196363 A1 | * | 12/2015 | ............ H04W 84/02 |
|----|------------------|---|---------|------------------------|
| WO | 2018029654 A1 | | 2/2018 | |
| WO | 2019005797 A1 | | 1/2019 | |
| WO | 2019010130 A1 | | 1/2019 | |
| WO | 2019184688 A1 | | 10/2019 | |
| WO | 2019185008 A1 | | 10/2019 | |
| WO | 2019191977 A1 | | 10/2019 | |
| WO | 2020037207 A1 | | 2/2020 | |

OTHER PUBLICATIONS

Nokia, et al., "Way forward on URLLC/IIOT operation support in unlicensed spectrum," 3GPP TSG-RAN Meeting #88-c, RP-200800, Jul. 3, 2020 (Mar. 7, 2020).

Samsung, "Handling UE Types in FR2," 3GPP TSG-RAN WG4 Meeting #87, R4-1806430, May 25, 2018 (May 25, 2018).

* cited by examiner

TECHNIQUES FOR NODE DIRECTED UPLINK (UL) CANCELLATION AND CHANNEL ACCESS IN UNLICENSED BANDS

FIELD

The present application relates to wireless devices, and more particularly to apparatus, systems, and methods for performing inter-user device uplink (UL) cancellation and channel access in unlicensed bands in a wireless communication system.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for performing inter-user device uplink (UL) cancellation and channel access in unlicensed bands in a wireless communication system.

In certain cases, a scheduled transmission of a User Equipment (UE) may need to be cancelled to allow another UE to transmit. Certain wireless systems include different categories of UEs associated with different priorities. For example, 5G-NR systems may include enhanced mobile broadband (eMBB) devices, which can include traditional UE devices, such as mobile devices, wireless devices, computing devices, etc., as well as Ultra-Reliable Low-Latency Communication (URLLC) devices. Of note, 5G-NR systems may include other categories of devices which have been omitted for clarity, but to which the techniques discussed herein, may apply. These URLLC devices are devices that support emerging latency-sensitive multimedia use cases and applications, such as augment/virtual reality systems, telemedicine, UltraHD, autonomous vehicles and devices, etc. These URLLC devices are expected to need a relatively large amount of bandwidth with minimal delays (e.g., low latency). To help provide low latency, URLLC devices may be prioritized over eMBB devices. As a part of prioritization, a scheduled uplink period of an eMBB may be cancelled before a transmitting eMBB is done transmitting.

In certain cases, the wireless system, including eMBB and URLLC devices may be configured to operate in one or more unlicensed bands or spectrum. Unlicensed spectrum generally refers to frequency bands which are designated for unlicensed use (e.g., no license is needed to use) and made available for public use. This may be contrasted against licensed spectrum which are frequency bands which are designated for use by a particular entity, such as a network operator, or for a specific purpose. As any unlicensed bands are available for public use, their may be interference avoidance techniques implemented by devices configured to use these unlicensed bands, such as listen before talk (LBT). Thus, there is a desire for an improved UL cancellation technique that takes into account challenges presented by operating in unlicensed bands.

According to aspects of the present disclosure, a technique for wireless communications in a wireless system including: receiving, from a first user device, cancellation capability information, receiving, from a second user device, unlicensed frequency transmission capability information, receiving, from the first user device, an uplink transmission over an unlicensed frequency band, determining, a need for a higher priority uplink transmission by the second user device, scheduling an uplink cancellation time for the first user device based on the cancellation capability information and unlicensed frequency transmission capability information, scheduling an uplink transmission time for the second user device based on the cancellation capability information and unlicensed frequency transmission capability information, transmitting an uplink cancellation request to the first user device based on the scheduled uplink cancellation time, and transmitting an uplink transmission time for the higher priority uplink transmission to the second user device based on the scheduled uplink transmission time.

In some aspects, the technique may further comprise cases wherein unlicensed frequency transmission capability information indicates that the second user device supports transmitting without sensing whether the unlicensed frequency band is in use, and wherein the uplink cancellation time is the same as the uplink transmission time. In some aspects, the technique may further comprise cases wherein unlicensed frequency transmission capability information indicates that the second user device supports transmitting without sensing whether the unlicensed frequency band is in use, and wherein the cancellation capability information indicates that the first user device has a cancellation time capability longer than a gap time period, and further comprising scheduling a reservation transmission in the unlicensed frequency band based on the cancellation time capability and a sensing time of the sensing. In some aspects, the technique may further comprise cases wherein the cancellation capability information indicates that the first user device has a cancellation time capability equal to or less than a gap time period, and further comprising scheduling a reservation transmission in the unlicensed frequency band based on the cancellation time capability and the uplink transmission time. In some aspects, the technique may further comprise cases wherein unlicensed frequency transmission capability information indicates that the second user device supports transmitting after sensing that the unlicensed frequency band is in use, the sensing having a sensing time period, wherein the cancellation capability information indicates that the first user device has a cancellation time capability shorter than the sensing time period, and wherein the uplink cancellation time is scheduled based on the sensing time period. In some aspects, the technique may further comprise cases wherein unlicensed frequency transmission capability information indicates that the second user device supports transmitting after sensing that the unlicensed frequency band is in use, the sensing having a sensing time period, wherein the cancellation capability information indicates that the first user device has a cancellation time capability longer than the sensing time period. In some aspects, the technique may further comprise cases including determining a maximum contention time window size based on the unlicensed frequency transmission capability information for the second user device, transmitting an indication of the maximum contention time window size to one or more user devices, the one or more user device including at least the second user device, wherein the scheduled the uplink transmission time for the second user device is based on an end of the maximum contention time window, and receiving a reservation transmission from a user device of the one or more user devices that acquires the unlicensed frequency band.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various embodiments is considered in conjunction with the following drawings, in which.

Figure 1:
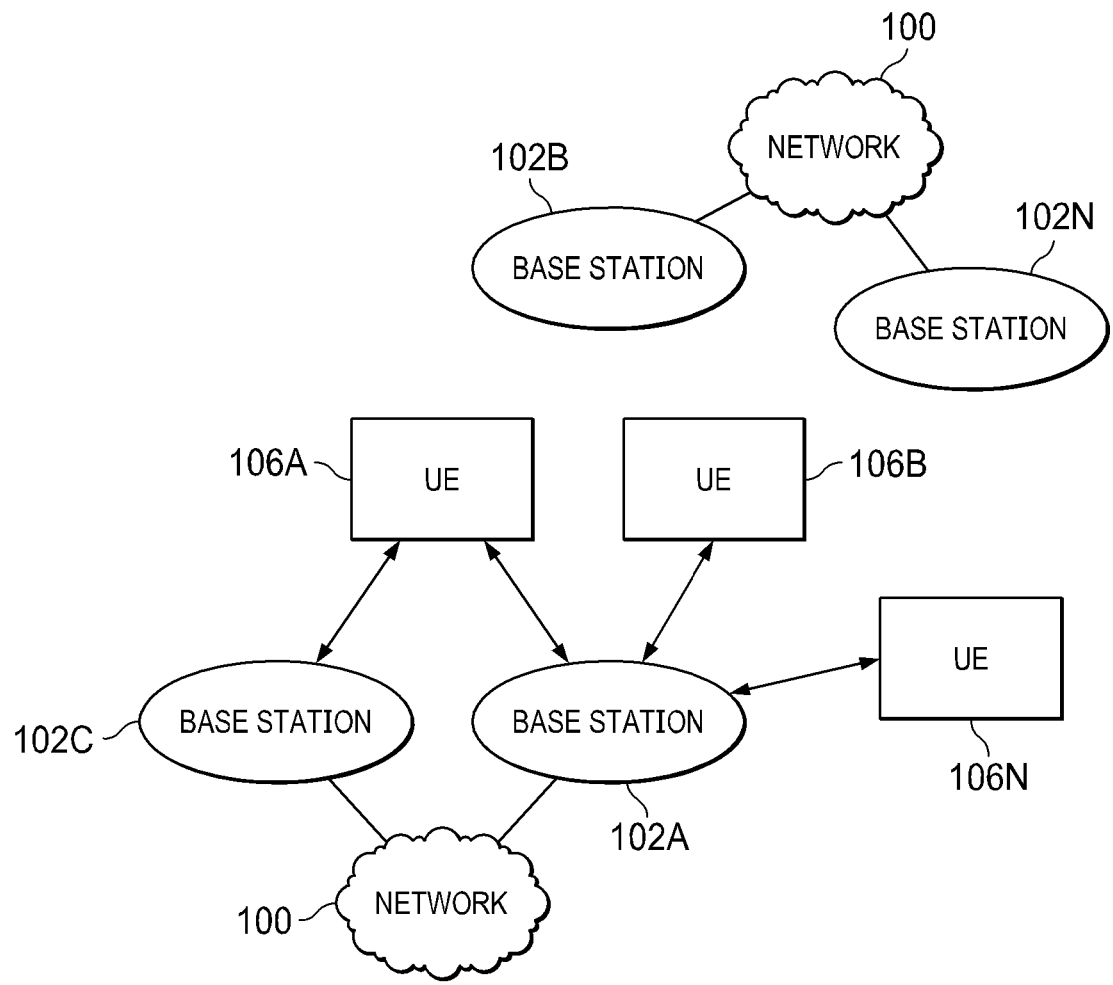
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network.

The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™ Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system. For example, if the base station is implemented in the context of LTE, it may alternatively be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," etc., are not intended to limit the concepts discussed herein to any particular wireless technology and the concepts discussed may be applied in any wireless system.

Node—The term "node," as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device, Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide, Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Unlicensed band—The term "unlicensed band" has the full breadth of its ordinary meaning, and at least includes a section of spectrum (e.g., radio frequency spectrum) which is available for public use without a license to transmit on the section of spectrum. Often devices operating in an unlicensed band are not regulatorily protected from interference and may be subject to power and other authorization limits. An example of unlicensed band device includes non-licensed transmitter devices which comply with the regulations in Part 15 of the Federal Communications Commission (FCC) rules.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system)

analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some embodiments. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pica" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB." in some embodiments, a gNB may be connected to a legacy evolved packet core (EPC) network and/or to a NR core (NRC) 5G core (5GC) network. In addition, a gNB cell may include one or more transition and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
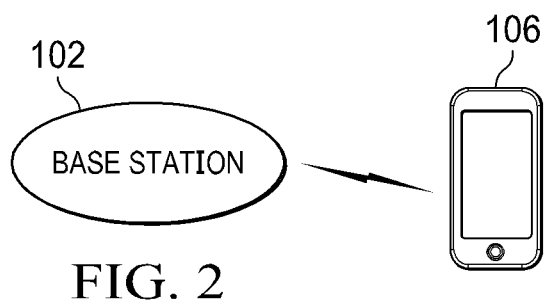
FIG. 2 illustrates a base station (BS) in communication with a user equipment (UE) device, according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

Figure 3:
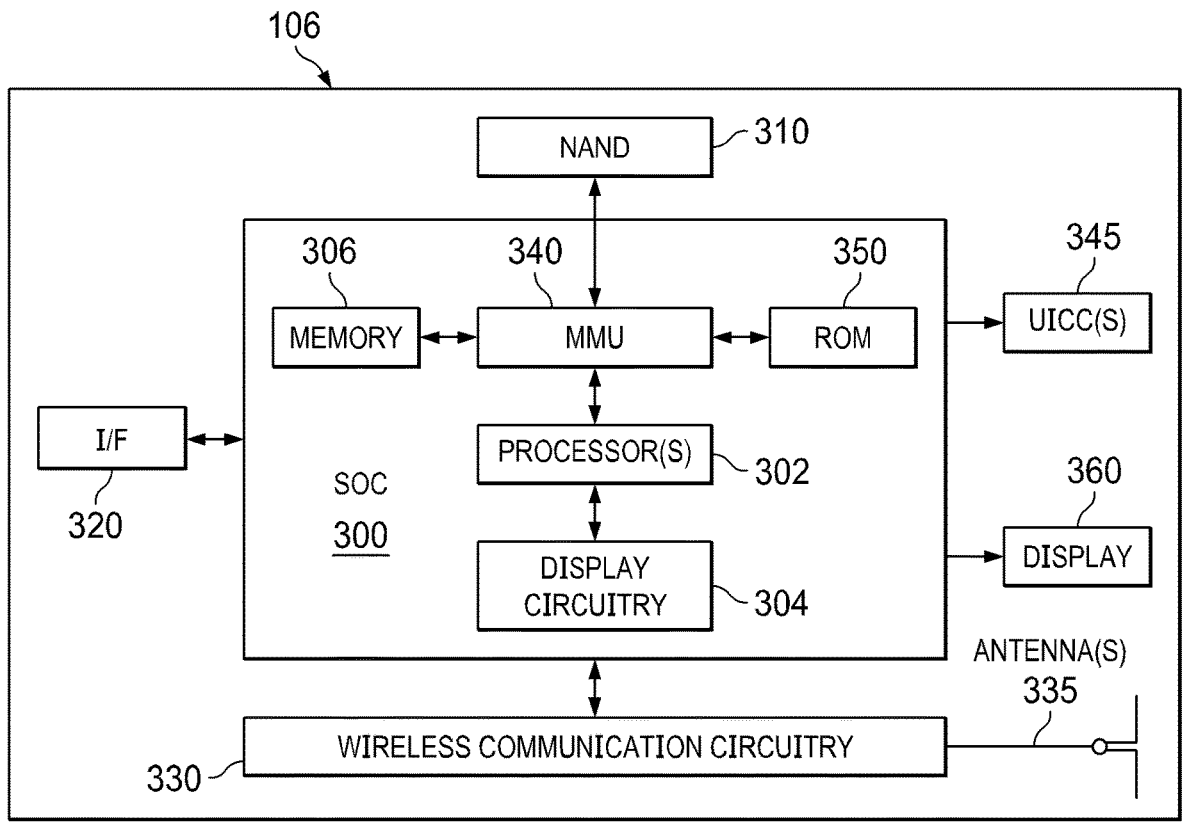
FIG. 3 illustrates an example block diagram of a UE, according to some Embodiments.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible, Example Communication Device FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smartcards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
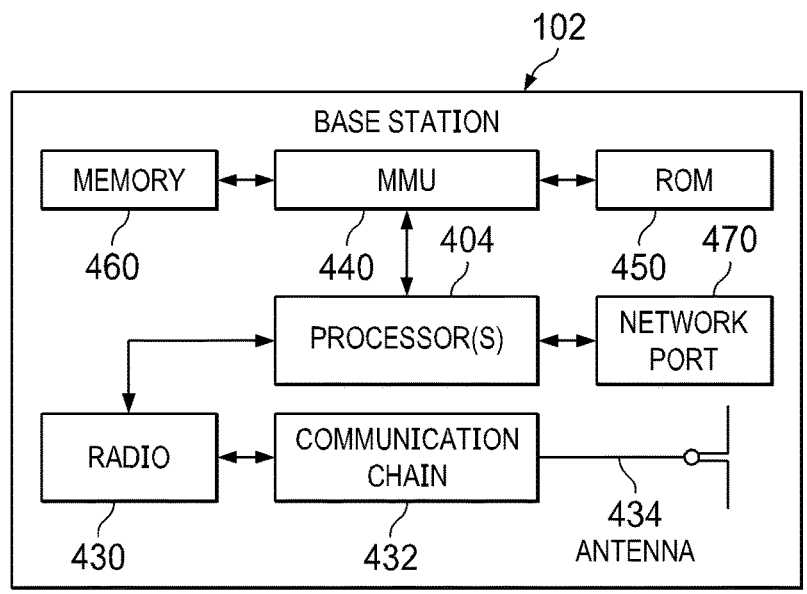
FIG. 4 illustrates an example block diagram of a BS, according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB." In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPS). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432,

434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
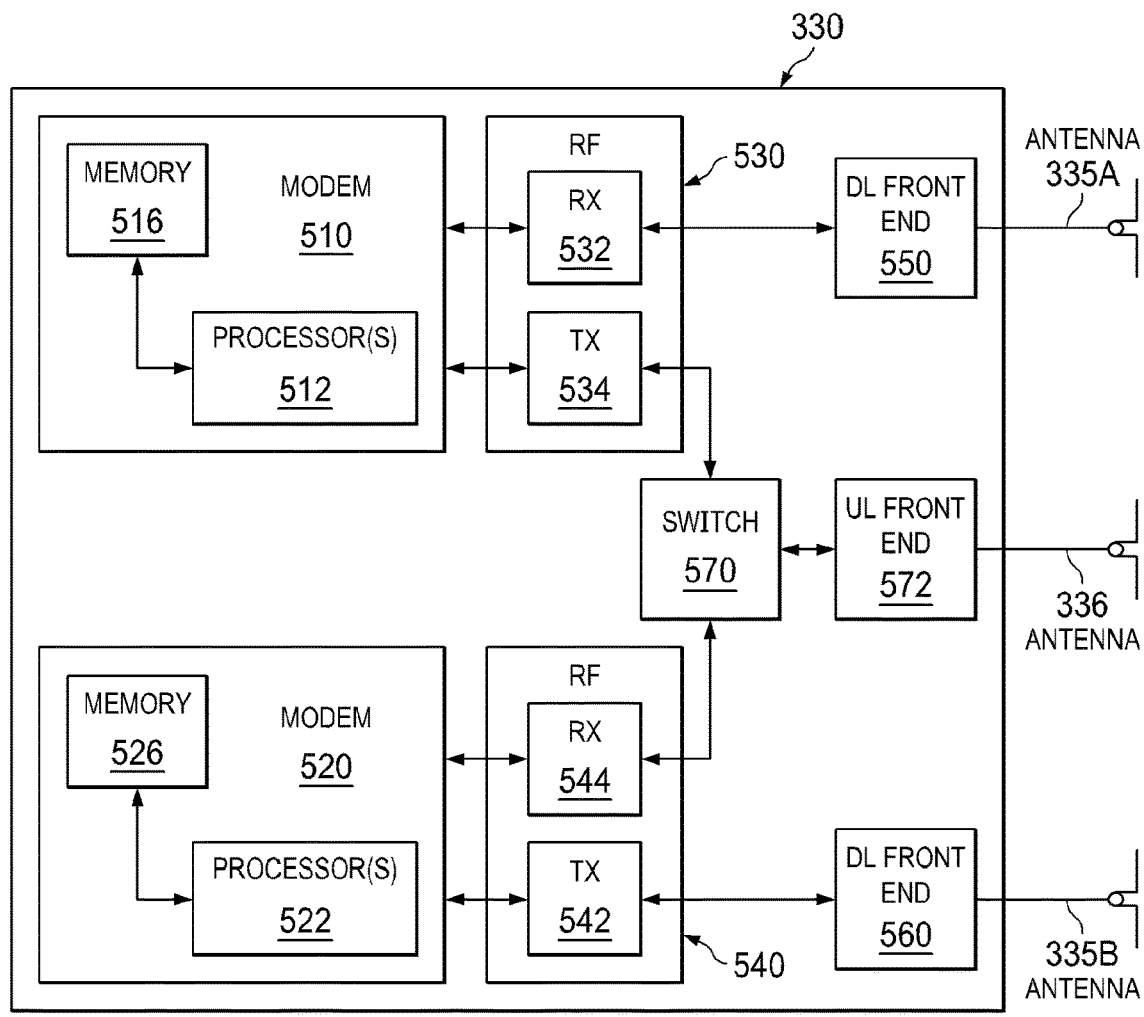
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATS (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly the second modem 520 may include one or more processors 522 and a memory 526 in communication with processors 522. Modem 520 may be in communication with an RF front end 540. RE front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to LI front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit), Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Example Network Element

Figure 6:
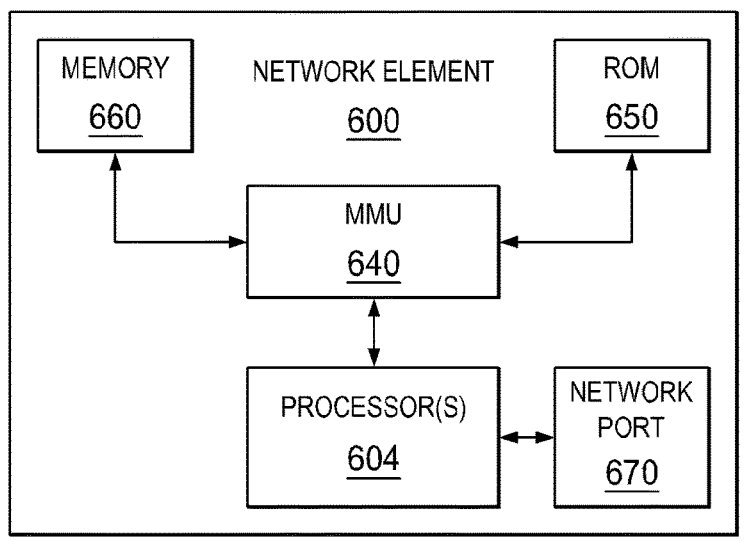
FIG. 6 illustrates an example block diagram of a network element, according to some embodiments.

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Uplink Transmission Cancellation

Figure 7:
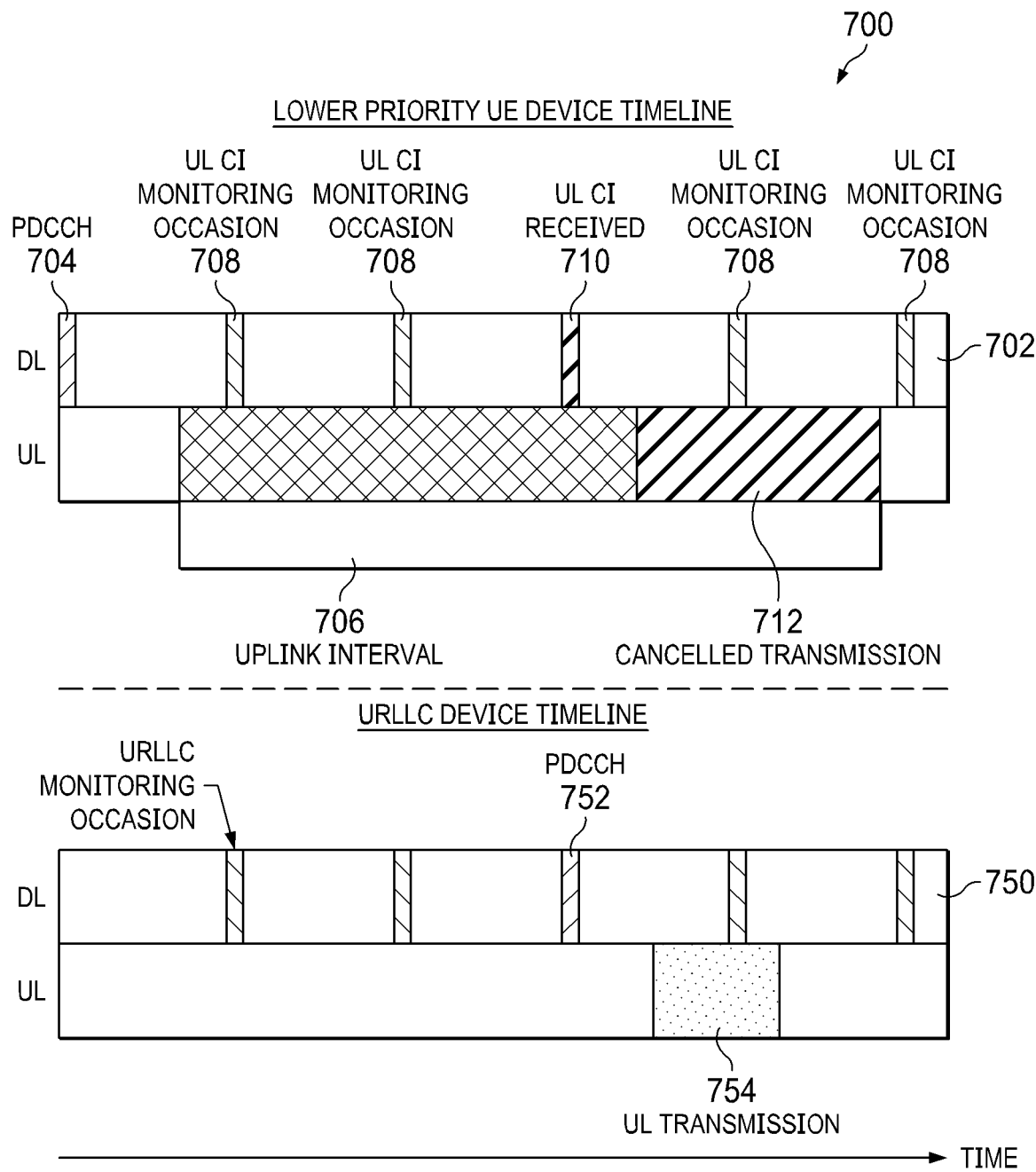
FIG. 7 illustrates an example timing diagram of an uplink cancellation, in accordance with aspects of the present disclosure.

FIG. 7 illustrates an example timing diagram 700 of an uplink cancellation 700, in accordance with aspects of the present disclosure. The timing diagram 700 includes a timeline for a lower priority UE device 702 and a timeline for a higher priority UE device 750 for a single period of time. As an example, the lower priority UE device 702 may be an eMBB device, massive machine type communication (mMTC) device, etc., and the higher priority UE device 750 may be a URLLC device. As shown, the lower priority UE device 702 receives a lower priority UE device PDCCH message 704 scheduling an uplink interval 706, during which the lower priority UE device 702 may transmit. In certain cases, the lower priority UE device PDCCH message 704 may be sent to and provide a transmission and reception schedule for multiple lower priority UE devices. To facilitate cancelling a scheduled uplink of a UE during transmission, the UE may listen for an uplink cancellation indication (UL CI) during defined UL CI monitoring occasions 708. In certain cases, UL CI may be sending using a new radio network temporary identifier (RNTI), such as a cancellation indication RNTI (CI-RNTI). The UL CI message helps allow specific transmissions and/or repetitions to be cancelled individually. Upon receipt of the UL CI 710 during a monitoring occasion, the lower priority UE device 702 may cancel its uplink 712 by stopping its transmission. By stopping the transmission of the lower priority UE device 702, the higher priority UE device 750 may be scheduled, e.g., via a higher priority LIE device PDCCH 752, to transmit 754 without interference. By cancelling the uplink from the lower-priority UE device, the higher priority UE device is able to transmit without having to wait for the full uplink interval 706 of the lower priority UE device to pass. In certain cases, the cancelled UE does not automatically resume transmitting, but may be rescheduled at a later time, for example by another lower priority UE device PDCCH message.

Figure 8:
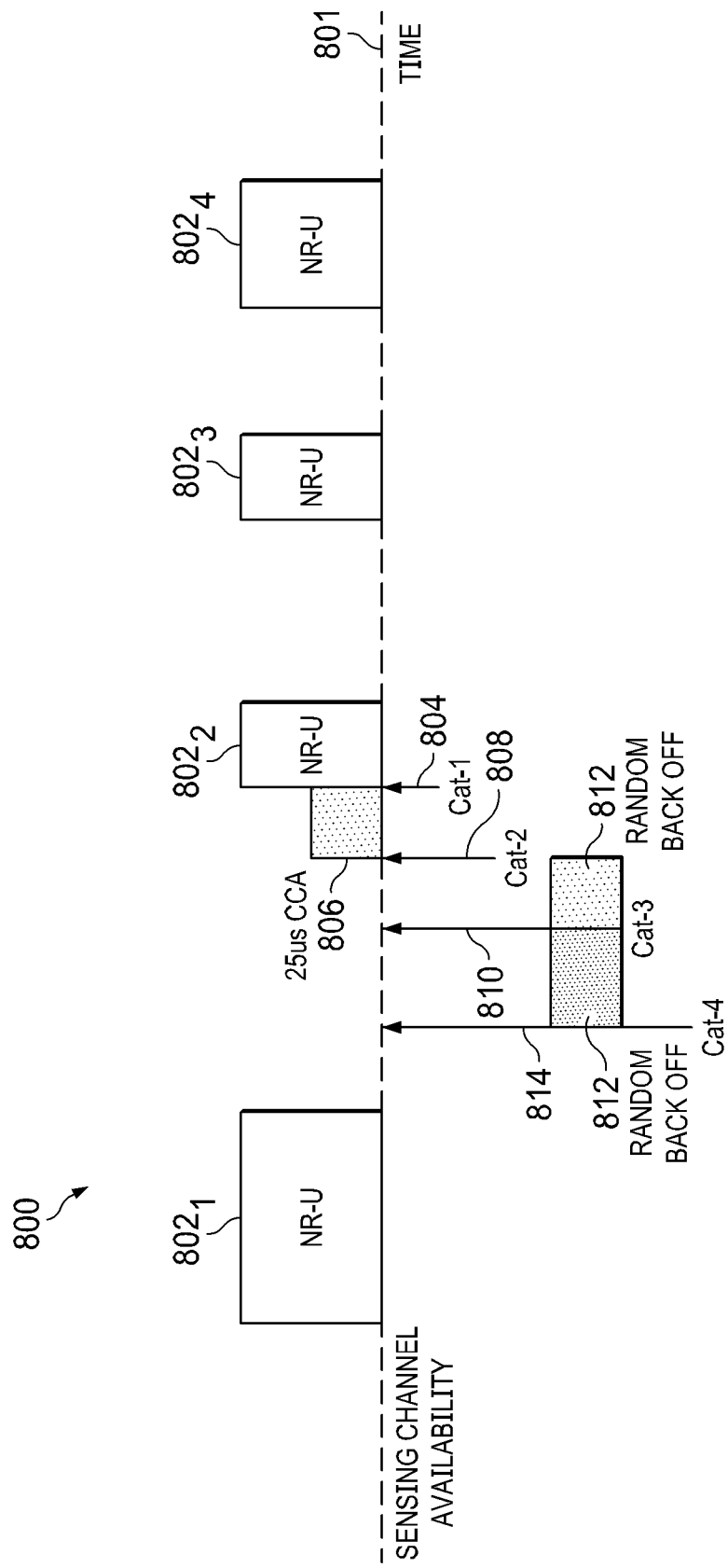
FIG. 8 is a timing diagram illustrating an unlicensed band channel access procedure, in accordance with aspects of the present disclosure.

In certain cases, the UL CI may include a 2D bitmap indicating a time and frequency resource region being cancelled. The UL CI defines a reference time region in time and frequency within which the UL CI is to be applied. The reference time region for which a UL CI is applicable starts X symbols after the ending symbol of the PDCCH CORESET carrying the UL CI. A CORESET is a set of physical resources, such as a downlink resource grid, and a set of parameters used to carry the PDCCH/Downlink Control Information (DCI). detecting a power level on the unlicensed band, and determining that the detected power level is below a threshold power level FIG. 8 is a timing diagram illustrating an unlicensed band channel access procedure 800, in accordance with aspects of the present disclosure. As unlicensed bands are accessible publicly, other devices may be transmitting on the unlicensed bands. Additionally, devices which operate on unlicensed bands are often expected to attempt to minimize interference with other devices also operating on the unlicensed bands. To help share access to the unlicensed bands, wireless devices, such as UEs, may be configured to listen-before-talk (LBT). In LBT, the wireless device listens on the unlicensed band that the wireless device wants to use to determine whether the unlicensed band is already in use. LBT may be implemented in many ways. One implementation is load based equipment (LBE), in which channel sensing of the unlicensed band may be performed at any time as needed by a wireless device. Multiple categories of LBE may be defined for interoperability of multiple devices associated with a particular type of wireless network. For example, in certain wireless networks, categories of LBT may be defined and wireless devices may implement one or more categories of LBT. FIG. 8 illustrates wireless transmissions $802_1$-$802_4$ by NR unlicensed band (NR-U) devices on the unlicensed band over time 801 with examples of four categories of LBT support (e.g., NR-U LBT categories). Devices which support category 1 (CAT-1) 804 may transmit 8022 on the unlicensed based immediately without listening 804 on the unlicensed band first (e.g., no LBT). There may be other limitations on CAT-1 device, for example, a duration of an UL performed without LBT sensing may be limited to a certain amount of time, such as 584 μs.

Devices which support category 2 (CAT-2) may sense the licensed band for a fixed amount of time without a random back-off period. If the CAT-2 device senses 808 that no other devices are transmitting during the CCA period, the CAT-2 device begins transmitting after the CCA period 806 ends. If another transmission is detected during the CCA period 806, then the CAT-2 device does not transmit. In this example, the CAT-2 device may sense 808 for other devices during a 25 μs clear channel assessment (CCA) period 806. In certain cases, a wireless system, such as NR-U, multiple CCA periods may be defined, each with specific sensing timings. For example, a UE may support CAT-2, 25 where the UE may transmit after immediately after a 25 μs CCA if it determines that the unlicensed bank is idle. During the CCA, the UE may sense the unlicensed band during two sensing slots. These sensing slots may be 9 μs in length, where the first sensing slot occurs at the beginning of the CCA, and the second sensing slot begins 16 μs after the beginning of the CCA. Sensing that the unlicensed band is idle within a sensing slot occurs by detecting a power level on the unlicensed band, and determining that the detected power for at least a sensing duration, such as 4 μs within the sensing slot, is less than a predefined detection threshold. If the unlicensed band is sensed to be idle in both sensing slots, then the unlicensed band is considered idle under CAT-2, 25.

As another example, a UE may support CAT-2, 16, where the UE may transmit immediately after a 16 µs CCA if it determines that the unlicensed band is idle. During the CCA, the UE may sense the unlicensed band by detecting a power level on the unlicensed band, and determining that the detected power level is below a threshold power level for a total of 5 µs, where at least 4 µs of the sensing must occur within the last 9 µs of the 16 µs CCA. It should be understood that 25 and 16 µs are example CCA periods and other CCA periods are possible.

Devices which support category 3 (CAT-3) may first wait for the unlicensed band to be idle for a time period, such as 16 µs, and then sense 810 within a fixed sized contention window of time. If the CAT-3 device senses 810 that another device is transmitting during the contention window, then the CAT-3 device will back off for a random period of time 812 and try to sense 810 the unlicensed channel again. The CAT-3 device may sense at a random time within the fixed size (e.g., length) contention window. Sensing may be performed by detecting a power level on the unlicensed band and determining whether that the detected power level is below a threshold power level. If the CAT-3 device senses 810 that no other devices are transmitting during sensing, the CAT-3 device begins transmitting. Category 4 (CAT-4) devices are similar to CAT-3 except that CAT-4 devices sense 814 within a variable size contention window. Otherwise, back off and sensing in CAT-4 operates similarly to CAT-3.

Generally, uplink channel occupancy times (COT) of the unlicensed band may be initiated by a node or a wireless device. In a node initiated COT, the node may obtain access to the unlicensed band and transmit an indication to one or more UEs to transmit uplink bursts on one or more of physical uplink shared channel (PUSCH), physical uplink control channel (PUCCH), physical random access channel (PRACH), and/or sounding reference signal (SRS). For a wireless device initiated COT, the wireless device may obtain access to the unlicensed band, for example, using CAT-4 LBT process, and transmit an uplink control information (UCI) PUSCH.

In certain cases, higher priority UE devices, such as URLLC devices, as well as lower priority UE devices, such as eMBB devices, may both operate on unlicensed bands and it may be desirable to enable uplink cancellation on unlicensed bands. However, devices operating on unlicensed bands may be configured to perform channel access procedures to help reduce potential interference, such as LBT. If the lower priority UE device cancels it's uplink transmission too early, a third UE may start transmitting on the unlicensed band before the higher priority UE device can perform an LIST and being transmitting. Similarly, if the lower priority UE device cancels it's uplink transmission too late, the higher priority UE may detect the uplink transmission and determine that the unlicensed band is in use and either back off or not transmit. Additionally, the lower priority UE device may have a cancellation capability where the lower priority UE device is either able to cancel its uplink transmission at a specific time, or cancel its uplink transmission with some accuracy within a certain time window from a specific time. Thus, in accordance with aspects of the present disclosure, a technique for UL cancellation and channel access in unlicensed bands may take into account the LBT behavior of the higher priority UE device as well as a cancellation capability of the lower priority UE device. Initially, To provide node initiated UL cancellation in unlicensed bands, three broad cancellation classes may be defined based on the LBE category of the higher priority UE device. The first cancellation class may include scenarios where the higher priority UE device supports CAT-1. The second cancellation class may include scenarios where the higher priority UE device supports CAT-2, and the third cancellation class may include scenarios where the higher priority UE device supports CAT-4 and CAT-3. Each cancellation class may include sub-classes based on whether a lower priority UE device is capable of cancelling its uplink transmission at a specific time, or if the lower priority UE device is able to cancel its transmission within a cancellation time window.

Initially, a gNB may determine which cancellation class and sub-classes may be applicable, for example, based on signaled UE capability information. For example, a UE device which may supports uplink cancellation may transmit cancellation capability information for unlicensed bands to a gNB. This cancellation capability information may be transmitted, for example, as a part of capability signaling, such as in a UE capability information message sent as part of establishing a connection with a gNB. In certain cases, this cancellation capability information may indicate whether the UE is capable of cancelling an uplink transmission at a specific time or specify a cancellation time tolerance or cancellation time window in which it can cancel an uplink transmission. In certain cases, one or more classes of uplink cancellation tolerance categories may be defined. For example, a class may be defined for those UEs which support uplink cancellation at a specific time, another class defined for those UEs which support cancellation within a 10 µs window, another with a 20 µs window, etc., and the UE may indicate its uplink cancellation tolerance category. In other cases, uplink cancellation tolerance may be defined for certain categories of UEs (e.g., UL cat. 1, UL cat 2, etc.). Similarly, higher priority UE devices may indicate what cancellation class(es) they support.

UE Uplink Cancellation Timing Diagram Examples

Figure 9:
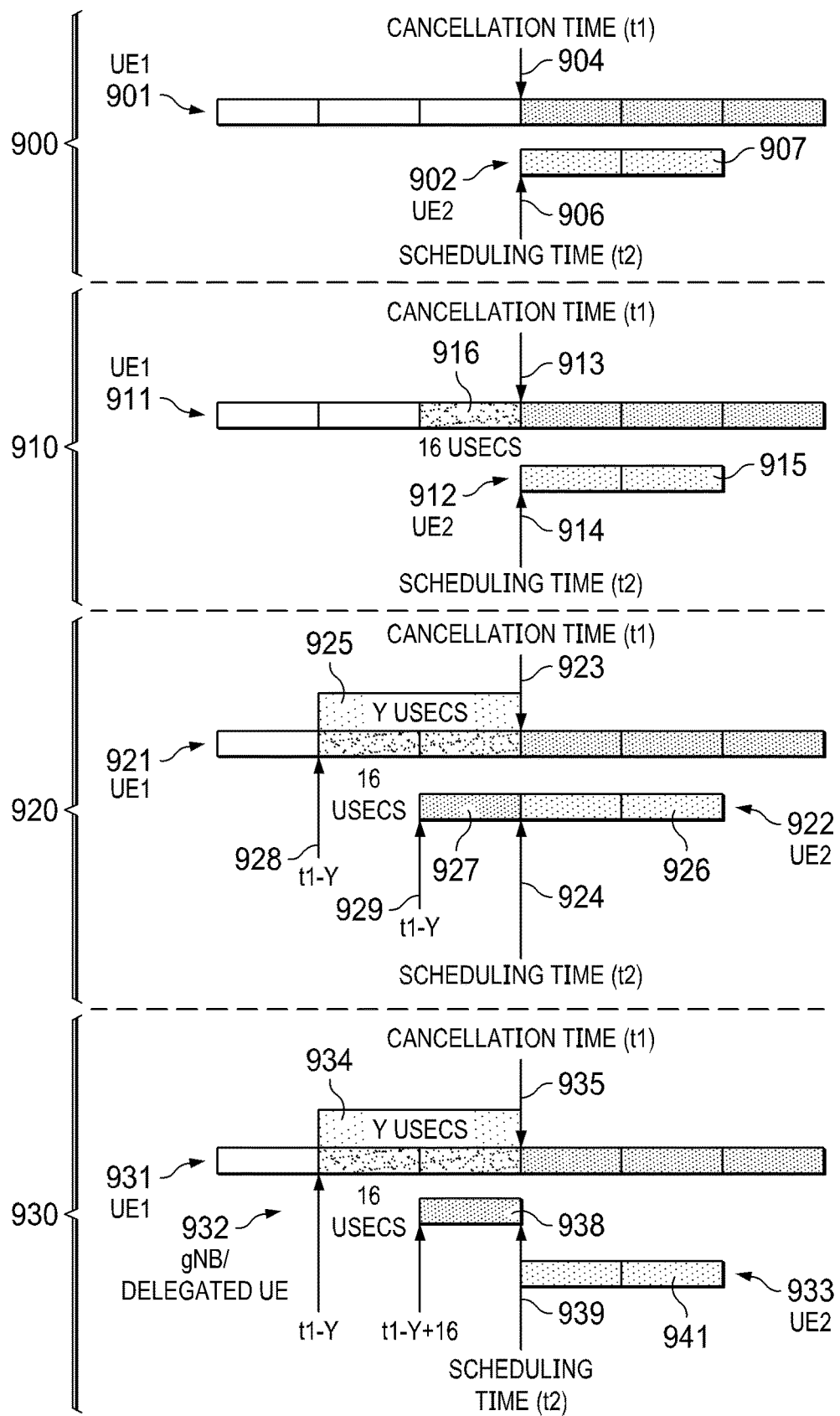
FIGS. 9-12 illustrate example timing diagrams, in accordance with aspects of the present disclosure.

FIG. 9 illustrate example timing diagrams, in accordance with aspects of the present disclosure. For consistency and clarity purposes, for timing diagrams illustrated in FIGS. 9-12 which have multiple UEs (e.g., UE1, UE2, etc.) in a single timeline, UE1 represents a lower priority UE device which has a scheduled UL transmission being cancelled, UE2 represents a high priority. UE device that may be scheduled to transmit in place of the canceled uplink transmission, and delegated UE represents another UE device. It may be understood that UE1 may also represent a group of one or more UEs, where the one or more UEs are together addressed by the UL CI. In certain cases, where UE1 represents a group of one or more UEs with mixed cancellation tolerances, the most limiting cancellation tolerance may be used for the group. For example, if a first UE of the group of one or more UEs supports uplink cancellation at a specific time, while a second UE of the group supports uplink cancellation within a cancellation time window, the gNB may use a cancellation subclass consistent with the second UE for the group of one or more UEs. It may be understood that the timing diagrams illustrated in FIGS. 9-12 assume that UE1 has previously received a UL CI during a monitoring occasion with a scheduled cancellation time at time t1.

The timing diagrams shown in FIG. 9 illustrate examples of the first cancellation class (e.g., higher priority UE device supports CAT-1 uplink transmissions on an unlicensed band). In certain cases, UEs configured to use the first cancellation class should begin their UL transmission within 16 µs of when the cancelled UE, UE1, stops transmitting as this helps avoid allowing other UEs, such as CAT-2, CAT-3, and CAT-4 devices to start transmitting.

Timing diagram 900 illustrates an example UL cancellation in an unlicensed band with a higher priority UE device supporting the first cancellation class and where the lower priority UE device, such as UE1 901, capable of cancelling a first uplink at a specific time. In such scenarios, if the gNB receives an indication that the UE1 901 is capable of cancelling the first uplink transmission at a specific 904, the gNB can schedule the first uplink transmission of UE1 901 to be cancelled at cancellation time t1 904 and also schedule a second uplink 907 of UE2 902 to begin within 16 μs of the cancellation. The gNB can schedule the cancellation of the first uplink of UE1 901 and the transmission of the second uplink 907 from UE2 902 such that there is less than a 16 μs gap between the cancellation of UE1 901 and the transmission from UE2 902. In certain cases, the scheduled cancellation of UE1 901 and the scheduled beginning of the second uplink transmission 907 of UE2 902 may be the same time. The gNB can indicate to UE2 902 to use CAT-1 for the second uplink transmission 907 and indicate to UE2 902 a specific time to begin the second uplink transmission 907. In certain cases, the start and duration of the uplink transmission from the higher priority UE may be sent as a start and length indicator value (SLIV) parameter value.

Timing diagram 910 illustrates an example UL cancellation in an unlicensed band with a higher priority UE device supporting the first cancellation class and where the lower priority UE device is capable of cancelling a first uplink associated with the lower priority UE within a maximum gap time window. This maximum gap time window may be a period of time defined, for example, by a standard or based on sensing timings for other devices configured to operate on the unlicensed band. In certain cases, this maximum gap time window may be a 16 μs time window. For example, if the gNB receives an indication that the UE1 911 is capable of cancelling a first uplink transmission within the 16 μs cancellation time window 916 of cancellation time t1 913, the gNB may schedule the cancellation of the first uplink transmission of UE1 911 at cancellation time t1 913 and schedule a second uplink transmission 915 from UE2 912 to begin at time t2 914, where the cancellation time t1 913 is the same as the time t2 914. As the UE1 911 can cancel within 16 μs of cancellation time 913, scheduling UE2 912 to begin the second uplink transmission 915 at the same time as cancellation time t1 913 ensures that the second uplink transmission 915 of UE2 912 begins within 16 μs of when UE1 911 stops transmitting. The gNB can indicate to UE2 912 to use CAT-1 for its uplink transmission and indicate to UE2 912 a specific time to begin the uplink transmission 915.

Timing diagram 920 illustrates an example UL cancellation in an unlicensed band with a higher priority UE device supporting the first cancellation class and where the lower priority UE is capable of cancelling a first uplink associated with the lower priority UE in a time window greater the maximum gap time window. For example, the gNB may receive an indication that the UE1 921 is capable of cancelling a first uplink transmission in a cancellation time window 925 that is Y μs long, such as 33 μs. The gNB may indicate to UE2 922 to use CAT-1 for its uplink transmission and indicate to UE2 922 a specific time to begin a second uplink transmission 926. As Y is greater than a 16 μs maximum gap time window, the gNB may schedule the cancellation of the first uplink transmission of UE1 921 at cancellation time t1 923 and schedule a second uplink transmission 926 from UE2 922 to begin at time t2 924. In certain cases, the cancellation time t1 923 may be the same as the time t2 924. As UE1 921 may cancel the first uplink transmission up to Y=33 μs before the time t2 924 that UE2 922 is scheduled to start the second uplink, another device may potentially detect that the unlicensed band is free during this time and begin transmitting. To avoid this issue, the gNB may schedule UE2 922 to transmit a reservation transmission 927 on the unlicensed band during the cancellation time window 926 of UE1 921. The UE2 921 may begin to broadcast the reservation transmission 927 using CAT-1 and without LBT. In certain cases, the reservation transmission 927 may be scheduled to start at the beginning (e.g., t1−Y) 936 of the cancellation time window 926. In certain cases, the reservation transmission 927 may be scheduled to start at the maximum gap time window in the cancellation time window 926. For example, with a maximum gap time window of 16 μs, the reservation transmission 927 may be scheduled 16 μs (e.g., t1−Y+16, if t1=t2) 937 after the start of the cancellation time window 926.

In certain cases, the reservation transmission 927 may include an extended cyclic prefix. In other cases, the reservation transmission 927 may include information from a dedicated. SLIV table. In other cases, the reservation transmission 927 may include a portion of an existing SLIV table. In other cases, the reservation transmission 927 may include information about an upcoming, current, or previous transmission, such as a size, length, etc. In yet other cases, the reservation transmission 927 may be encoded based on another parameter, such as a LBT type of the transmitting device, power level information, set of UEs transmitting, etc. In certain cases, contents of the reservation transmission 927 may be repeated as needed to fill an amount of time for the reservation transmission 927. It may be understood that the exact contents of the reservation transmission 927 may vary as the reservation transmission 927 is intended to temporarily occupy the portion of the unlicensed band until the scheduled start of the second uplink transmission by UE2 921. In certain cases, the start and duration of the reservation transmission may be sent as a SLIV parameter value.

Timing diagram 930 illustrates an example variant of timing diagram 920, where the reservation transmission is transmitted by a wireless device other than the higher priority UE device. Similar to timing diagram 920, the gNB may receive an indication that the UE1 931 is capable of cancelling a first uplink transmission in a cancellation time window 935 that is Y μs long, and greater than a 16 μs maximum gap time window. The gNB can indicate to UE2 933 to use CAT-1 for its uplink transmission and indicate to UE2 933 a specific time to begin the uplink transmission 939. The gNB may schedule the cancellation of the first uplink transmission of UE1 921 at cancellation time t1 935 and schedule a second uplink transmission 941 from UE2 933 to begin at time t2 939. In certain cases, the cancellation time t1 935 may be the same as the time t2 939. The gNB may also schedule a reservation transmission 938 on the unlicensed band during the cancellation time window 934 of UE1 931 in a way similar to that described above with respect to timing diagram 920. However, instead of scheduling the UE2 933 to transmit the reservation transmission 938, in certain cases, the gNB can transmit the reservation transmission 938. In other cases, the gNB may schedule a delegated UE 932 to transmit the reservation transmission 938. The delegated UE 932 may be any wireless device capable of using CAT-1 for uplink transmissions. The reservation transmission 938 for the delegated UE 932 may include information similar to the reservation transmission described above. Additionally, the reservation transmission 938 for the delegated UE 932 may be encoded with other parameters such as a power level of the delegated UE 932, set of delegated UEs transmitting, etc. in certain cases, the delegated UE 932 may be a group of one or more UEs.

Figure 10:
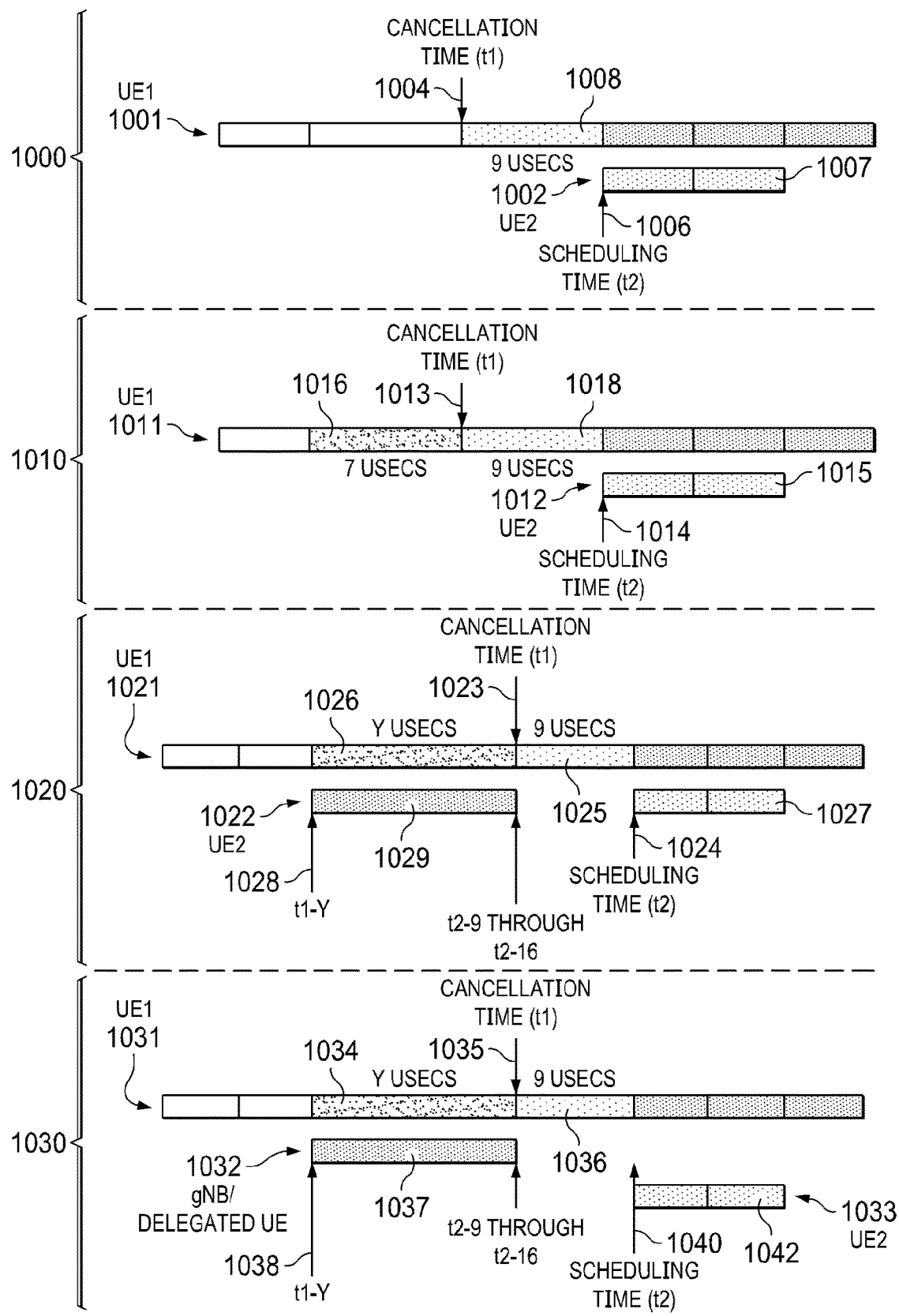

FIG. 10 illustrates example timing diagrams, in accordance with aspects of the present disclosure. The timing diagrams shown in FIG. 10 illustrate examples of the second cancellation class (e.g., higher priority UE device supports CAT-2 uplink transmissions on an unlicensed band). In these examples, the higher priority UE device may support CAT-2, 16 having a fixed CCA period of 16 µs, where at least 4 µs of the sensing must occur within the last 9 µs of the 16 µs CCA. For example, the gNB may receive an indication that the higher priority UE device supports CAT-2, 16 for uplink transmissions.

Timing diagram 1000 illustrates an example UL cancellation in an unlicensed band with a higher priority UE device supporting the second cancellation class and where the lower priority UE device, such as UE1 1001, capable of cancelling a first uplink at a specific time. In such scenarios, if the gNB receives an indication that the UE1 1001 is capable of cancelling the first uplink transmission at a specific time, the gNB can schedule the first uplink transmission of UE1 1001 to be cancelled at cancellation time t1 1004 and schedule a second uplink transmission of UE2 1002 to begin at least 9 µs after cancellation time 1004 and no more than 16 µs after cancellation time 1004. The gNB can indicate to UE2 1002 to use CAT-2, 16 for the second uplink transmission 1007 and indicate to UE2 1002 a specific time to begin the second uplink transmission 1007.

Timing diagram 1010 illustrates an example UL cancellation in an unlicensed band with a higher priority UE device supporting the second cancellation class and where the lower priority UE device is capable: of cancelling a first uplink associated with the lower priority UE at some time before the cancellation time. In this example, the higher priority UE device, UE2 1012, may support CAT-2, 16 having a fixed CCA period of 16 µs, and the maximum gap time window 1016 is 16−9=7 µs. Where UE1 indicates a specific number X cancellation time window, the gNB may schedule the cancellation time at least 16−X µs before the second uplink begins at schedule time t2 1014. For example, if the UE1 1011 indicates an ability to cancel the first uplink transmission within the maximum gap time window 1016 (e.g., within 7 µs of a cancellation time), the gNB may indicate to UE1 1011 a cancellation time t1 1013 at least 9 µs before the scheduled time t2 1014 for UE2 1012 to begin the second uplink transmission 1015 to allow for a medium sensing time 1018. In other cases, such as where an exact cancellation time window cannot be provided, the gNB may indicate to the UE2 1012 to use CAT-1 as discussed above with respect to FIG. 9.

Timing diagram 1020 illustrates an example UL cancellation in an unlicensed band with a higher priority UE device supporting the second cancellation class and where the lower priority UE is capable of cancelling a first uplink associated with the lower priority UE in a time window greater than or equal to a maximum gap time window. In this example, the higher priority UE device, UE2 1022, may support CAT-2, 16 having a fixed CCA period of 16 µs, and the maximum gap time window is 16−9=7 µs. In this example, the gNB may receive an indication that UE1 1021 is capable of cancelling a first uplink transmission in a cancellation time window 1026 that is Y µs long, where Y>=maximum gap time window. The gNB may indicate to UE2 1022 to use CAT-2, 16 for its uplink transmission and indicate to UE2 1022 a specific time t2 1024 to begin a second uplink transmission 1027. The gNB may also indicate to UE1 1021 to a cancellation time t1 1023. The cancellation time t1 1023 may be any time between the time t2 1024 UE2 1022 starts transmitting minus a medium sensing time 1025 (e.g., t2−9) and the time t2 1024 UE2 1022 starts transmitting minus the CCA period (e.g., t2−16). To help avoid another device from transmitting, gNB may schedule UE2 1022 to transmit a reservation transmission 1029 on the unlicensed band during the cancellation time window 1026. In certain cases, the reservation transmission 1029 may be scheduled to start at the beginning (e.g., t1−Y) 1028 of the cancellation time window 1026. For example, if UE1 1021 has indicated an exact time X for the cancellation time window 1026, then the reservation transmission 1029 may be scheduled to begin at t1−X. The reservation transmission 1029 may be scheduled to end at cancellation time t1 1023. This allows the unlicensed band to be reserved for UE2 1022 and provides time for sensing the unlicensed band prior to the second uplink transmission 1027. In this case UE2 1022 supports CAT-1 transmission on the unlicensed band to perform the reservation transmission 1029 and also supports an ability to rapidly switching from transmitting to receiving.

Timing diagram 1030 illustrates an example variant of timing diagram 1020, where the reservation transmission is transmitted by a wireless device other than the higher priority UE device. In this example, the higher priority UE device, UE2 1033, may support CAT-2, 16 having a fixed CCA period of 16 µs, and the maximum gap time window is 16−9=7 µs. As in timing diagram 920, the gNB may receive an indication that UE1 1031 is capable of cancelling a first uplink transmission in a cancellation time window 1034 that is Y µs long, where Y>=maximum gap time window. The gNB may indicate to UE2 1033 to use CAT-2, 16 for its uplink transmission and indicate to UE2 1033 a specific time t2 1040 to begin a second uplink transmission 1042. The gNB may also indicate to UE1 1031 to a cancellation time t1 1035 The cancellation time t1 1035 may be any time between the time t2 1042 UE2 1033 starts transmitting minus a medium sensing time 1036 (e.g., t2−9) and the time t2 1042. UE2 1033 starts transmitting minus the CCA period (e.g., t2−16). To help avoid another device from transmitting on the unlicensed band, the gNB may schedule a reservation transmission 1037 on the unlicensed band during the cancellation time window 1034 of UE1 1031 in a way similar to that described above with respect to timing diagram 1020. However, instead of scheduling the UE2 1033 to transmit the reservation transmission 1037, in certain cases, the gNB can transmit the reservation transmission 1037. In other cases, the gNB may schedule a delegated UE 1032 to transmit the reservation transmission 1037. The delegated UE 1032 may be any wireless device capable of using CAT-1 for uplink transmissions.

Figure 11:
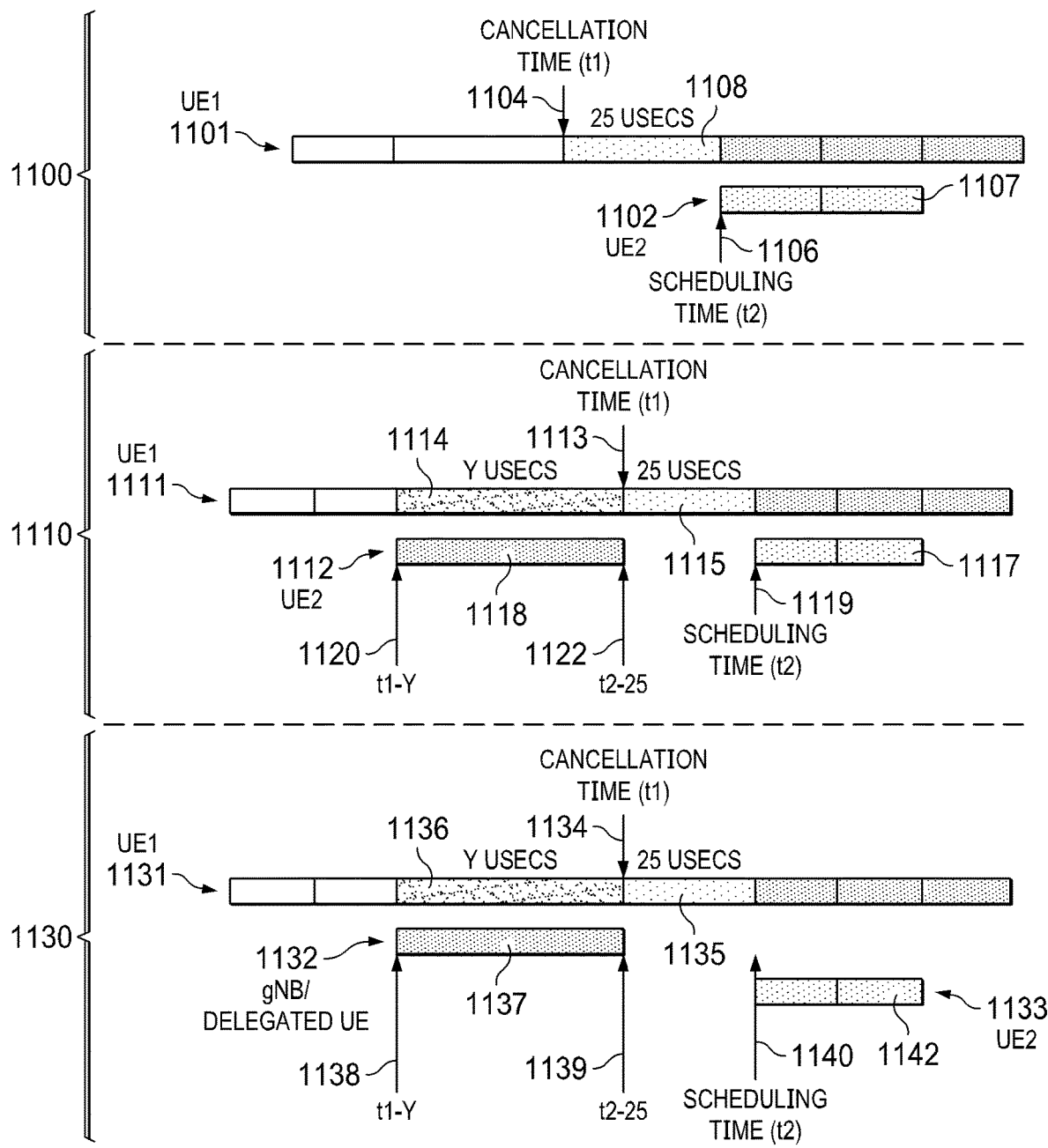

FIG. 11 illustrates example timing diagrams, in accordance with aspects of the present disclosure. The timing diagrams shown in FIG. 11 also illustrate examples of the second cancellation class (e.g., higher priority UE device supports CAT-2 uplink transmissions on an unlicensed band). In these examples, the higher priority UE device may support CAT-2, 25 having a fixed CCA period of 25 µs with one sensing period at the start of the CCA period and another sensing period at the end of the CCA period. For example, the gNB may receive an indication that the higher priority UE device supports CAT-2, 25 for uplink transmissions.

Timing diagram 1100 illustrates an example UL cancellation in an unlicensed band with a higher priority UE device supporting the second cancellation class and where the lower priority UE device, such as UE1 1101, capable of cancelling a first uplink at a specific time. If the gNB receives an indication that the UE1 1101 is capable of cancelling the first uplink transmission at a specific time, the gNB can schedule the first uplink transmission of UE1 1101 to be cancelled at cancellation time t1 1104 and schedule a second uplink transmission of UE2 1102 to begin at least 25 µs after cancellation time 1104. The gNB can indicate to UE2 1102 to use CAT-2, 25 for the second uplink transmission 1107 and indicate to UE2 1102 a specific time to begin the second uplink transmission 1107.

Timing diagram 1110 illustrates an example UL cancellation in an unlicensed band with a higher priority UE device supporting the second cancellation class and where the lower priority. UE device is capable of cancelling a first uplink associated with the lower priority UE at some time before the cancellation time. In this example, the higher priority UE device, UE2 1112, may indicate support for CAT-2, 25 having a fixed CCA period of 25 µs, and the lower priority UE device, UE1 1111 may indicate an ability to cancel a first uplink transmission in Y µs of a cancellation time t1 1113. Where UE1 indicates a specific number Y cancellation time window 1114, the gNB may schedule UE2 1112 to begin a second uplink transmission 1117 at time t2 1119 and indicate to UE1 1111 to cancel the first uplink transmission at cancellation time t1 1113 to allow for a 25 µs medium sensing time 1115. To help avoid another device from transmitting, gNB may schedule UE2 1122 to transmit a reservation transmission 1118 on the unlicensed band during the cancellation time window 1114. In certain cases, the reservation transmission 1118 may be scheduled to begin at the beginning of the cancellation time window 1114 (e.g., t1−Y 1120) and may be scheduled to end at the beginning of the CCA period before the second uplink transmission 1117) (e.g., at time t2−25 1122). This allows the unlicensed band to be reserved for UE2 1112 and provides time for sensing the unlicensed band prior to the second uplink transmission 1117. In this case UE2 1112 supports CAT-1 transmission on the unlicensed band to perform the reservation transmission 1118 and also supports an ability to rapidly switching from transmitting to receiving.

Timing diagram 1130 illustrates an example variant of timing diagram 1130, where the reservation transmission is transmitted by a wireless device other than the higher priority UE device. In this example, the higher priority UE device, UE2 1133, may support CAT-2, 25 having a fixed CCA period of 25 µs, and the lower priority UE device, UE1 1131 may indicate an ability to cancel a first uplink transmission in Y µs of a cancellation time t1 1134. Where UE1 indicates a specific number Y cancellation time window, the gNB may schedule UE2 1133 to begin a second uplink transmission 1142 at time t2 1140 and indicate to UE1 1131 to cancel the first uplink transmission at time t1 1134 to allow for a 25 µs medium sensing time 1115. To help avoid another device from transmitting on the unlicensed band, the gNB may schedule a reservation transmission 1137 on the unlicensed band during the cancellation time window 1136 of UE1 1131 in a way similar to that described above with respect to timing diagram 1110. However, instead of scheduling the UE2 1133 to transmit the reservation transmission 1137, in certain cases, the gNB can transmit the reservation transmission 1137. In other cases, the gNB may schedule a delegated UE 1132 to transmit the reservation transmission 1137. The delegated UE 1132 may be any wireless device capable of using CAT-1 for uplink transmissions.

Figure 12:
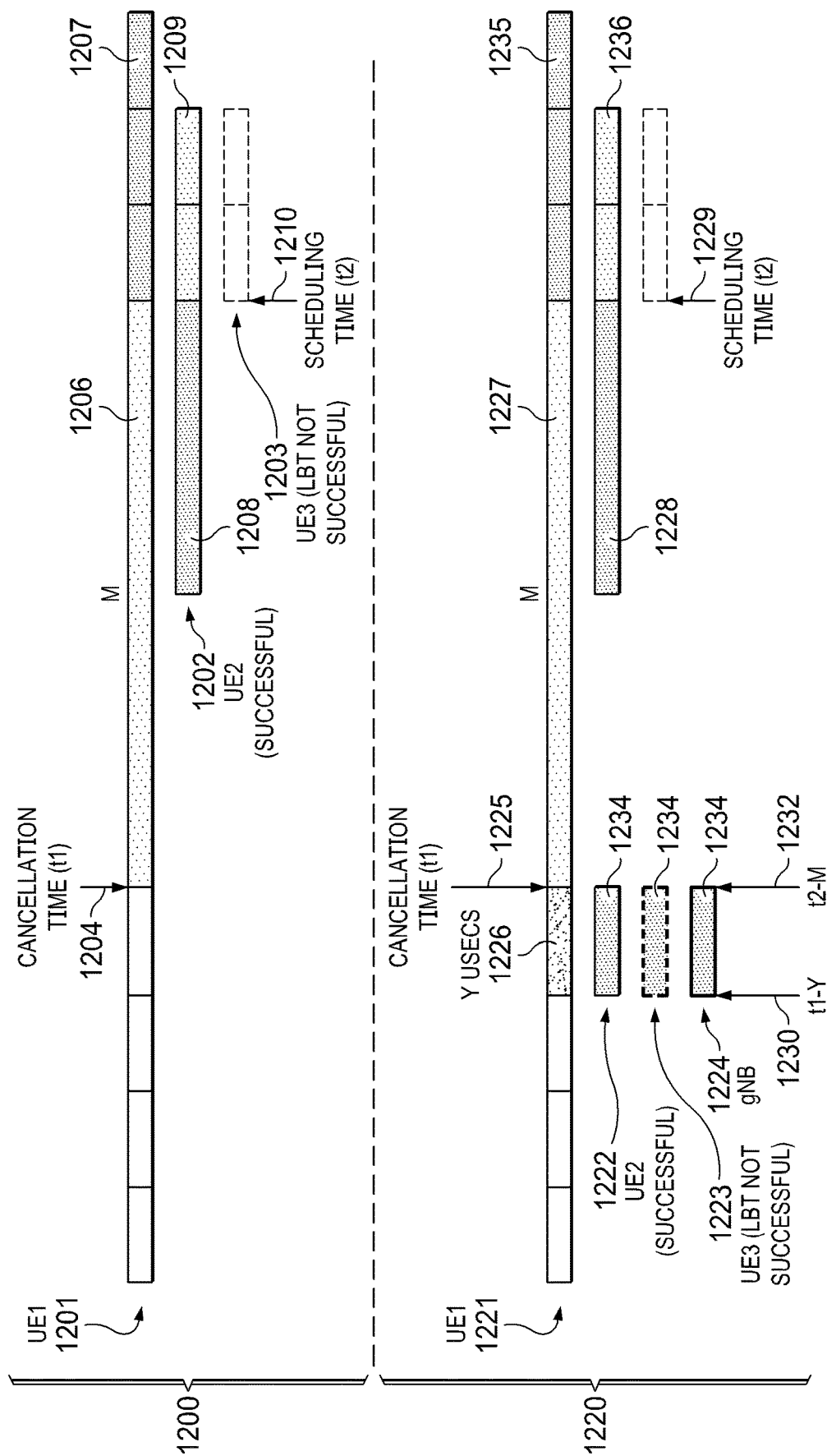

FIG. 12 illustrates example timing diagrams, in accordance with aspects of the present disclosure. The timing diagrams shown in FIG. 11 also illustrate examples of the third cancellation class (e.g., higher priority UE device supports CAT-3 and CAT-4 uplink transmissions on an unlicensed band). In these examples, the higher priority UE device may support CAT-3 with random backoff and a fixed contention window or CAT-4 with random backoff and a variable contention window. For example, the gNB may receive an indication that one or more higher priority UE devices support CAT-3 or CAT-4 for uplink transmissions. In these cases, a maximum contention time window may be defined. For CAT-3 the maximum contention time window may be based on the fixed contention window and for CAT-4, the maximum contention time window may be based on a maximum size of the variable contention window. In certain cases, the third cancellation class may not be useful in the scenario where a single higher priority UE device is scheduled. The third cancellation class may be more applicable when multiple higher priority UE devices may be scheduled during the cancelled uplink time. In certain cases, the gNB may signal the maximum contention time window to one or more UEs via. DCI signaling or configured in the RRC for the one or more UEs. The gNB may signal the one or more UEs to use CAT-3 or CAT-4 for the uplink transmission.

Timing diagram 1200 illustrates an example UL cancellation in an unlicensed band with higher priority UE devices, such as UE2 1202 and UE3 1203, supporting the third cancellation class and where the lower priority UE device, such as UE1 1201, is capable of cancelling a first uplink at a specific time. If the gNB receives an indication that the UE1 1201 is capable of cancelling the first uplink transmission at a specific time, the gNB can schedule the first uplink transmission of UE1 1201 to be cancelled at cancellation time t1 1204 and schedule a second uplink transmission of UE2 1102 and UE3 1203 to begin at time t2 1210, where time t2 1210 is equal to or greater than the maximum contention time window M 1206. The UEs, here UE2 1202 and UE3 1203, then contend during the contention window. In certain cases, during contention, each UE may randomly select a time during the contention window to listen for other transmissions on the unlicensed band and when the time to listen is over, if the unlicensed band is not being used (e.g., received power below a certain threshold), then a UE may determine that it has acquired the unlicensed band and start transmitting. When the UE successfully acquires the unlicensed band, here UE2 1202, the UE begins transmitting a reservation transmission 1208 on the unlicensed band during the remainder of the maximum contention time window M 1206. After the maximum contention time window M 1206 ends, the UE that successfully acquired the unlicensed band, UE2 1202, begins the second uplink transmission at time t2 1210.

Timing diagram 1220 illustrates an example UL cancellation in an unlicensed band with a higher priority UE device supporting the third cancellation class and where the lower priority UE device is capable of cancelling a first uplink associated with the lower priority UE at some time before the cancellation time. In this example, the higher priority UE devices, UE2 1222 and UE3 1223, may indicate support for CAT-3 or CAT-4 and the lower priority UE device, UE1 1221 may indicate an ability to cancel a first uplink transmission in Y µs of a cancellation time t1 1225 (e.g., within a cancellation window 1226 Y µs in length). In such cases, the gNB 1224 can schedule the first uplink transmission of UE1 1221 to be cancelled at cancellation time t1 1225 and schedule a second uplink transmission of UE2 1222 and UE3 1223 to begin at time t2 1229, where time t2 1229 is equal to or greater than the maximum contention time window M 1227. The gNB 1224 may also schedule a first reservation transmission 1234, to be transmitted by any combination of UE2 1222, UE3 1223, gNB 1224, or a delegated UE (not shown). In certain cases, the first reservation transmission 1234 may be scheduled to begin at the beginning of the cancellation time window 1226 (e.g., t1−Y 1230) and may be scheduled to end at the beginning of the maximum contention time window M 1227 (e.g., t2−M 1232). The UEs, here UE2 1222 and UE3 1223, then contend during the contention window. In certain cases, during contention, each UE may randomly select a time during the contention window to listen for other transmissions on the unlicensed band and when the time to listen is over, if the unlicensed band is not being used (e.g., received power below a certain threshold), then a UE may determine that it has acquired the unlicensed band and start transmitting. When the UE successfully acquires the unlicensed band, here UE2 1222, the UE may begin transmitting a second reservation transmission 1228 on the unlicensed band during the remainder of the maximum contention time window M 1227. After the maximum contention time window M 1227 ends, the UE that successfully acquired the unlicensed band, UE2 1222, begins the second uplink transmission at time t2 1236.

Exemplary UE Uplink Cancellation Methods in Unlicensed Bands

Figure 13A:
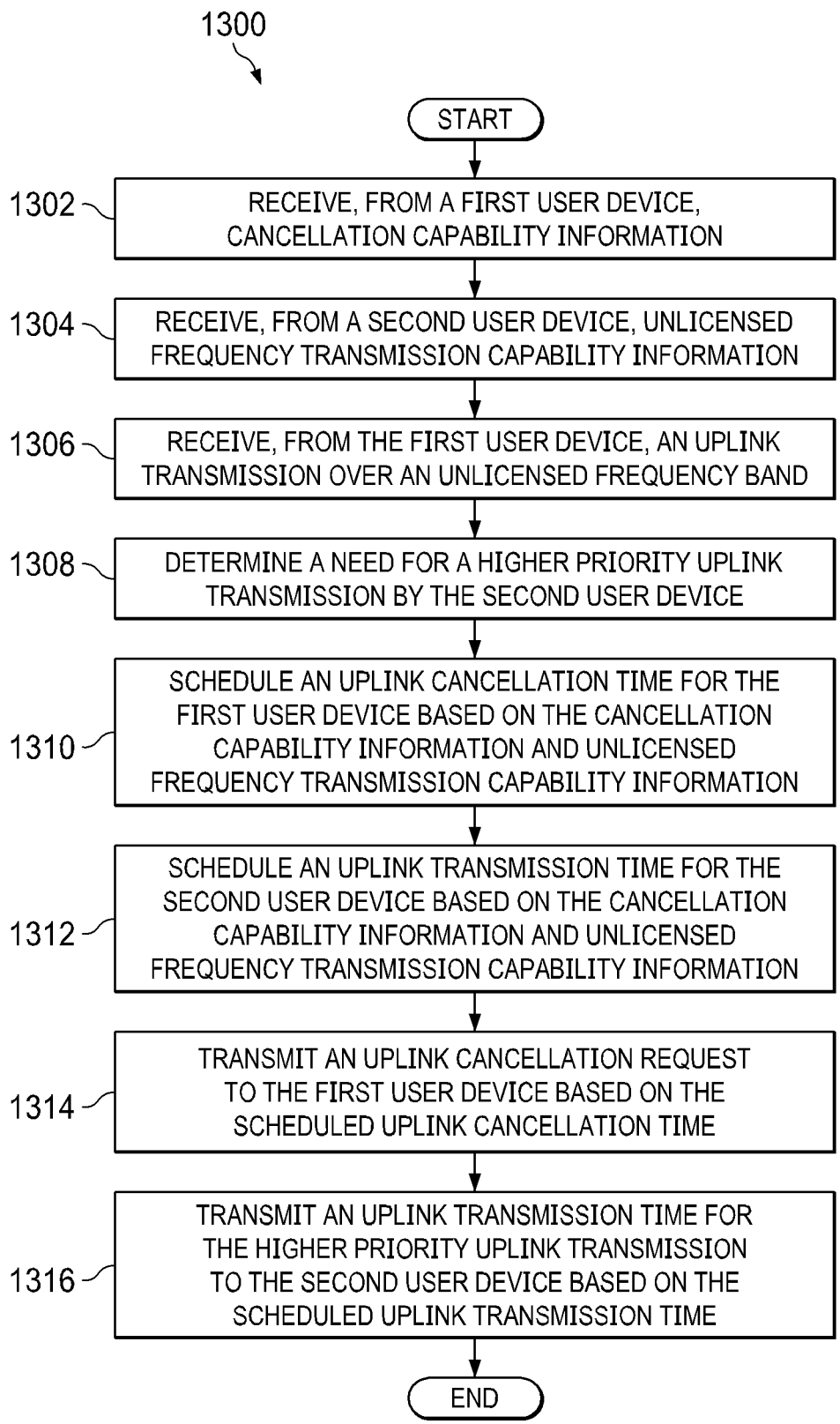
FIG. 13A is a flow diagram illustrating a technique for communications in a wireless system, in accordance with aspects of the present disclosure.

FIG. 13A is a flow diagram illustrating a technique 1300 for communications in a wireless system, in accordance with aspects of the present disclosure. At block 1302, cancellation capability information is received from a first user device. At block 1304, unlicensed frequency transmission capability information is received from a second user device. In certain cases, the transmission capability information may be sent autonomously by the UE to the node, or may be a scheduled by the gNB for the UE to transmit. In certain cases, transmission capability information may be sent as a part of a UE capability information. At block 1306, an uplink transmission over an unlicensed frequency band is received from the first user device. At block 1308, a need for a higher priority uplink transmission by the second user device is determined. At block 1310, an uplink cancellation time for the first user device is scheduled based on the cancellation capability information and unlicensed frequency transmission capability information. At block 1312, an uplink transmission time for the second user device is scheduled based on the cancellation capability information and unlicensed frequency transmission capability information. At block 1314, an uplink cancellation request is transmitted to the first user device based on the scheduled uplink cancellation time. At block 1316, an uplink transmission time for the higher priority uplink transmission is transmitted to the second user device based on the scheduled uplink transmission time.

Figure 13B:
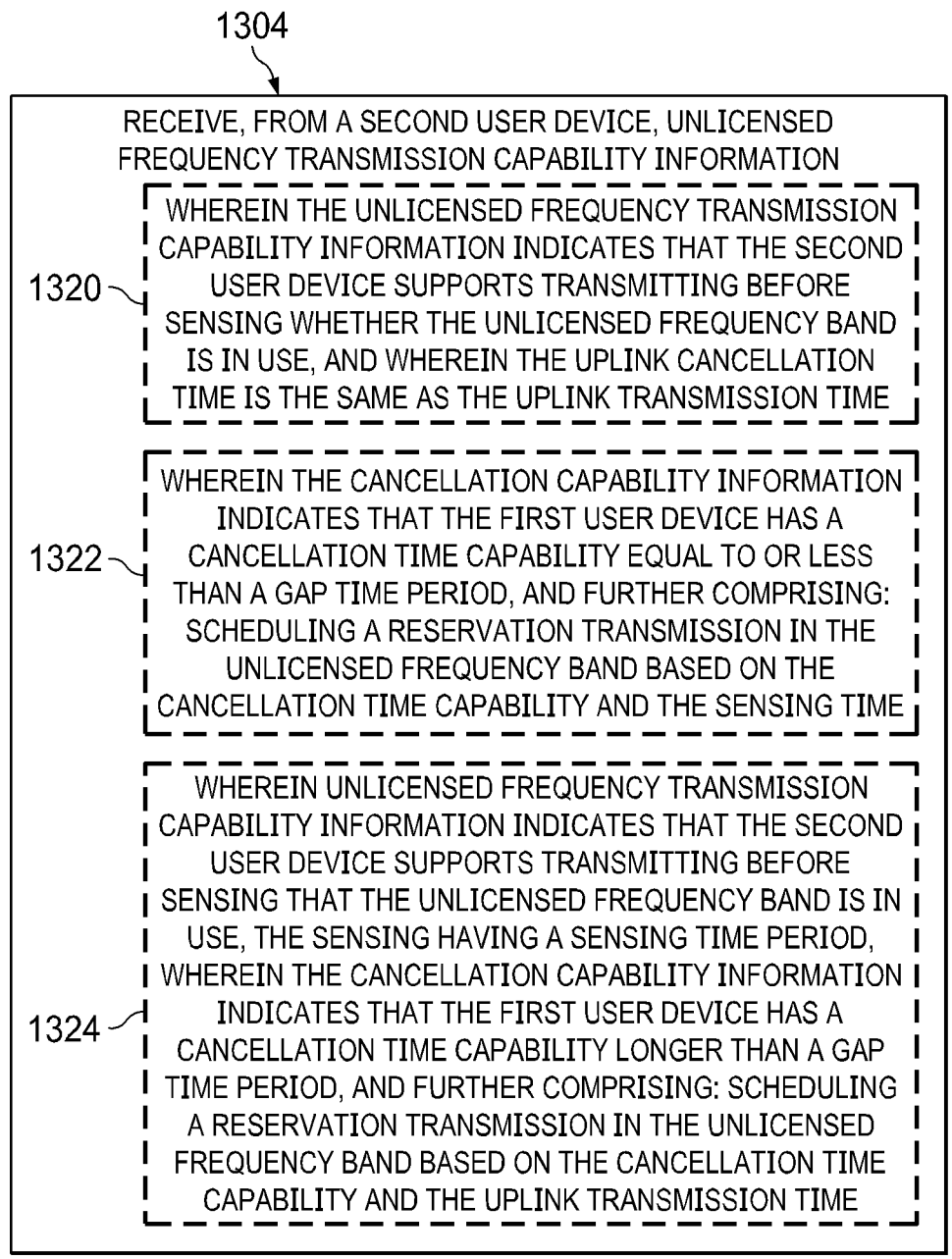
FIG. 13B is a flow diagram illustrating various ways to receive, from a second user device, unlicensed frequency transmission capability information, in accordance with aspects of the present disclosure.

FIG. 13B is a flow diagram illustrating various ways to receive, from a second user device, unlicensed frequency transmission capability information of step 1304, in accordance with aspects of the present disclosure. At block 1320, an option is presented for where the unlicensed frequency transmission capability information indicates that the second user device supports transmitting without sensing whether the unlicensed frequency band is in use, and wherein the uplink cancellation time is the same as the uplink transmission time. At block 1322, an option is presented for where the cancellation capability information indicates that the first user device has a cancellation time capability equal to or less than a gap time period, and further comprising scheduling a reservation transmission in the unlicensed frequency band based on the cancellation time capability and a sensing time of the sensing. At block 1324, an option is presented for where the unlicensed frequency transmission capability information indicates that the second user device supports transmitting without sensing that the unlicensed frequency band is in use, the sensing having a sensing time period, wherein the cancellation capability information indicates that the first user device has a cancellation time capability longer than a gap time period, and further comprising scheduling a reservation transmission in the unlicensed frequency band based on the cancellation time capability and the uplink transmission time.

Figure 13C:
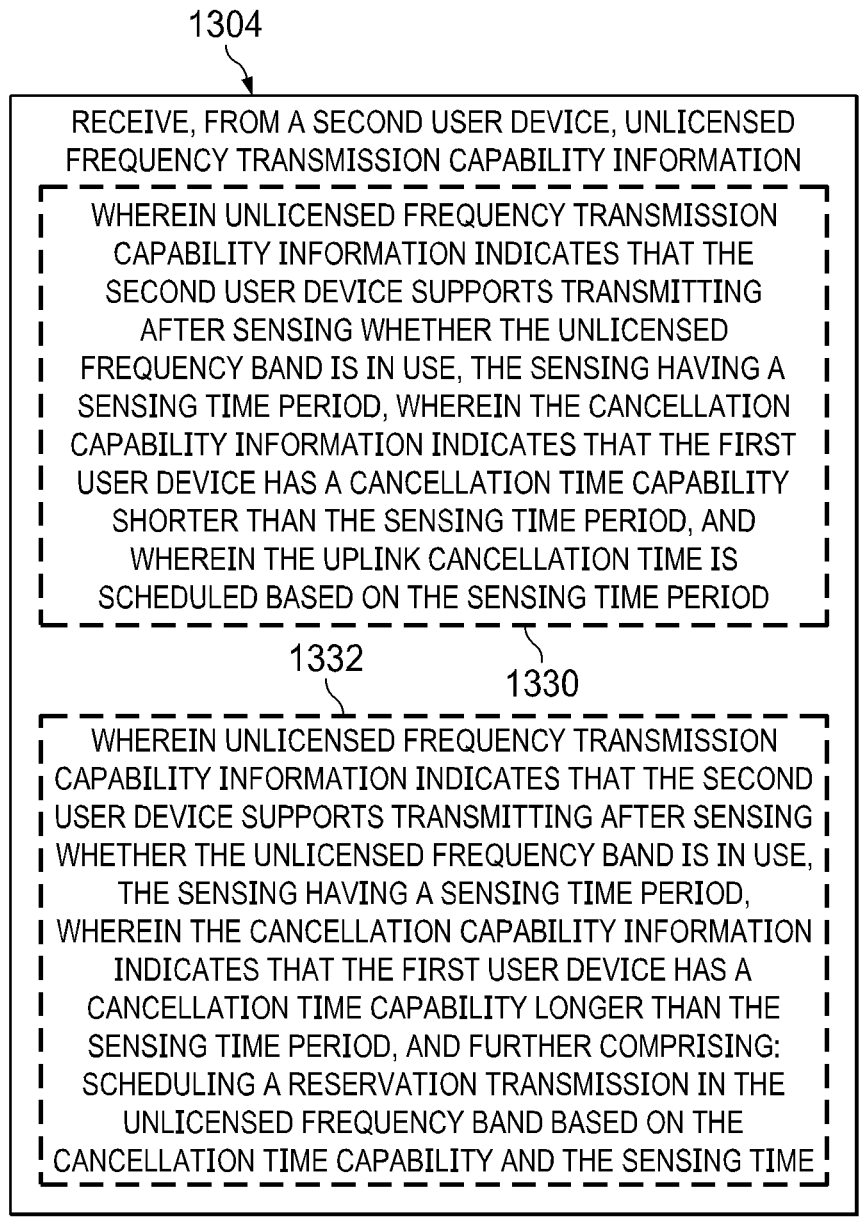
FIG. 13C is a flow diagram illustrating additional ways to receive, from a second user device, unlicensed frequency transmission capability information, in accordance with aspects of the present disclosure.

FIG. 13C is a flow diagram illustrating additional ways to receive, from a second user device, unlicensed frequency transmission capability information of step 1304, in accordance with aspects of the present disclosure. At block 1330, an option is presented for where the unlicensed frequency transmission capability information indicates that the second user device supports transmitting after sensing whether the unlicensed frequency band is in use, the sensing having a sensing time period, wherein the cancellation capability information indicates that the first user device has a cancellation time capability shorter than the sensing time period, and wherein the uplink cancellation time is scheduled based on the sensing time period. At block 1332, an option is presented for unlicensed frequency transmission capability information indicates that the second user device supports transmitting after sensing whether the unlicensed frequency band is in use, the sensing having a sensing time period, wherein the cancellation capability information indicates that the first user device has a cancellation time capability longer than the sensing time period, and further comprising scheduling a reservation transmission in the unlicensed frequency band based on the cancellation time capability and the sensing time.

Figure 13D:
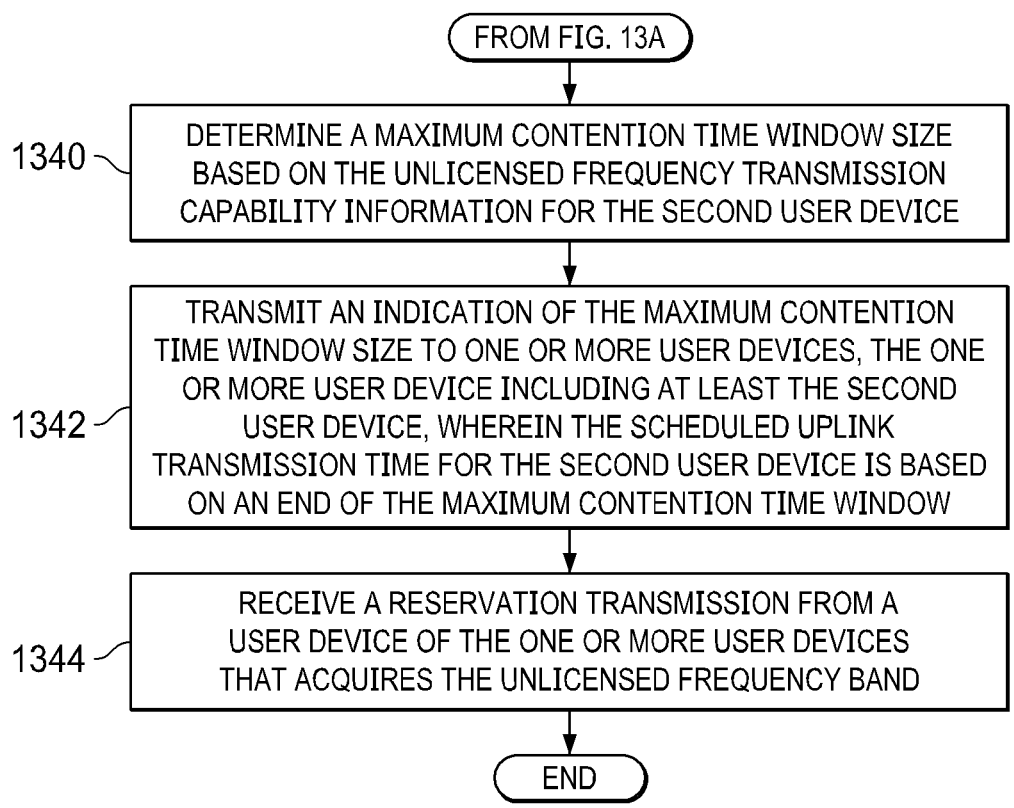
FIGS. 13D and 13E are flow diagrams illustrating optional ways for communications in a wireless system, in accordance with aspects of the present disclosure.

FIG. 13D is a flow diagram illustrating optional ways for communications in a wireless system, in accordance with aspects of the present disclosure. At block 1340, a maximum contention time window size may be determined based on the unlicensed frequency transmission capability information for the second user device. At block 1360, an indication of the maximum contention time window size may be transmitted to one or more user devices, the one or more user device including at least the second user device, wherein the scheduled the uplink transmission time for the second user device is based on an end of the maximum contention time window. At block 1380, a reservation transmission may be received from a user device of the one or more user devices that acquires the unlicensed frequency band.

Figure 13E:
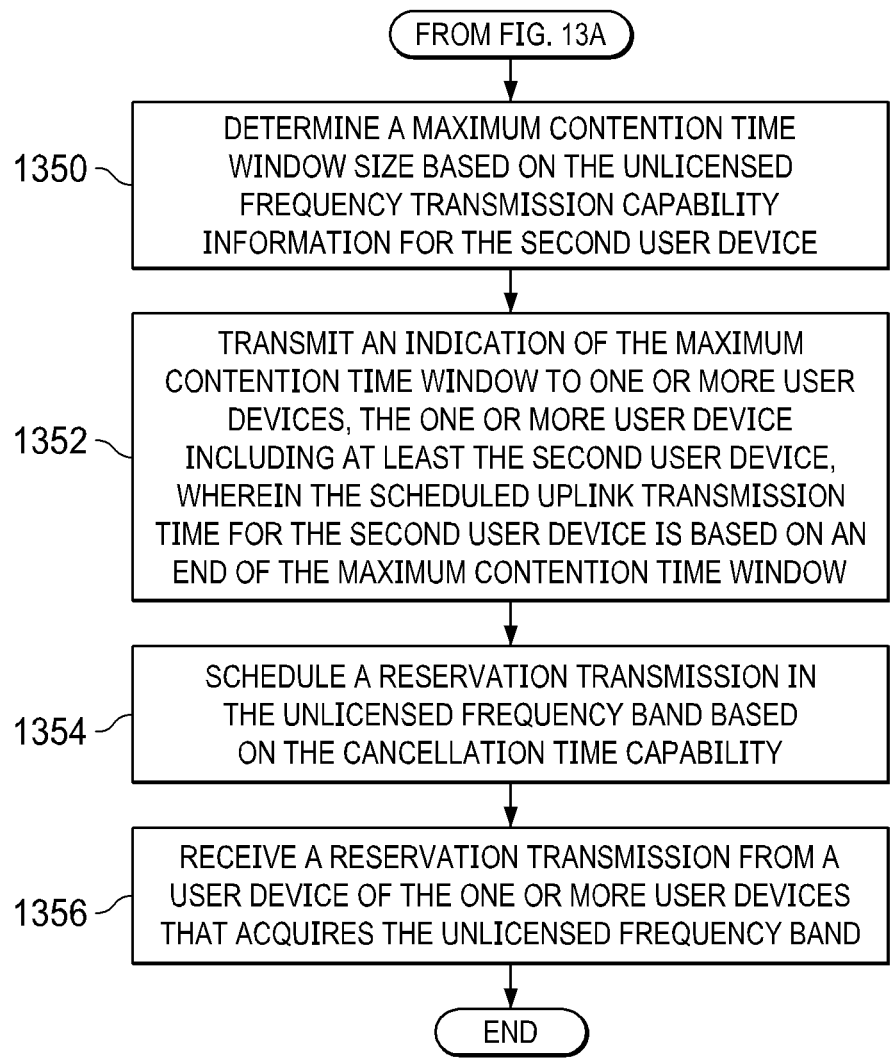

FIG. 13E is a flow diagram illustrating optional ways for communications in a wireless system, in accordance with aspects of the present disclosure. At block 1350, a maximum contention time window size may be determined based on the unlicensed frequency transmission capability information for the second user device. At block 1352, an indication of the maximum contention time window may be transmitted to one or more user devices, the one or more user device including at least the second user device, wherein the scheduled the uplink transmission time for the second user device is based on an end of the maximum contention time window. At block 1354, a reservation transmission may be scheduled in the unlicensed frequency band based on a cancellation time capability. At block 1356, a reservation transmission may be received from a user device of the one or more user devices that acquires the unlicensed frequency band.

Figure 14A:
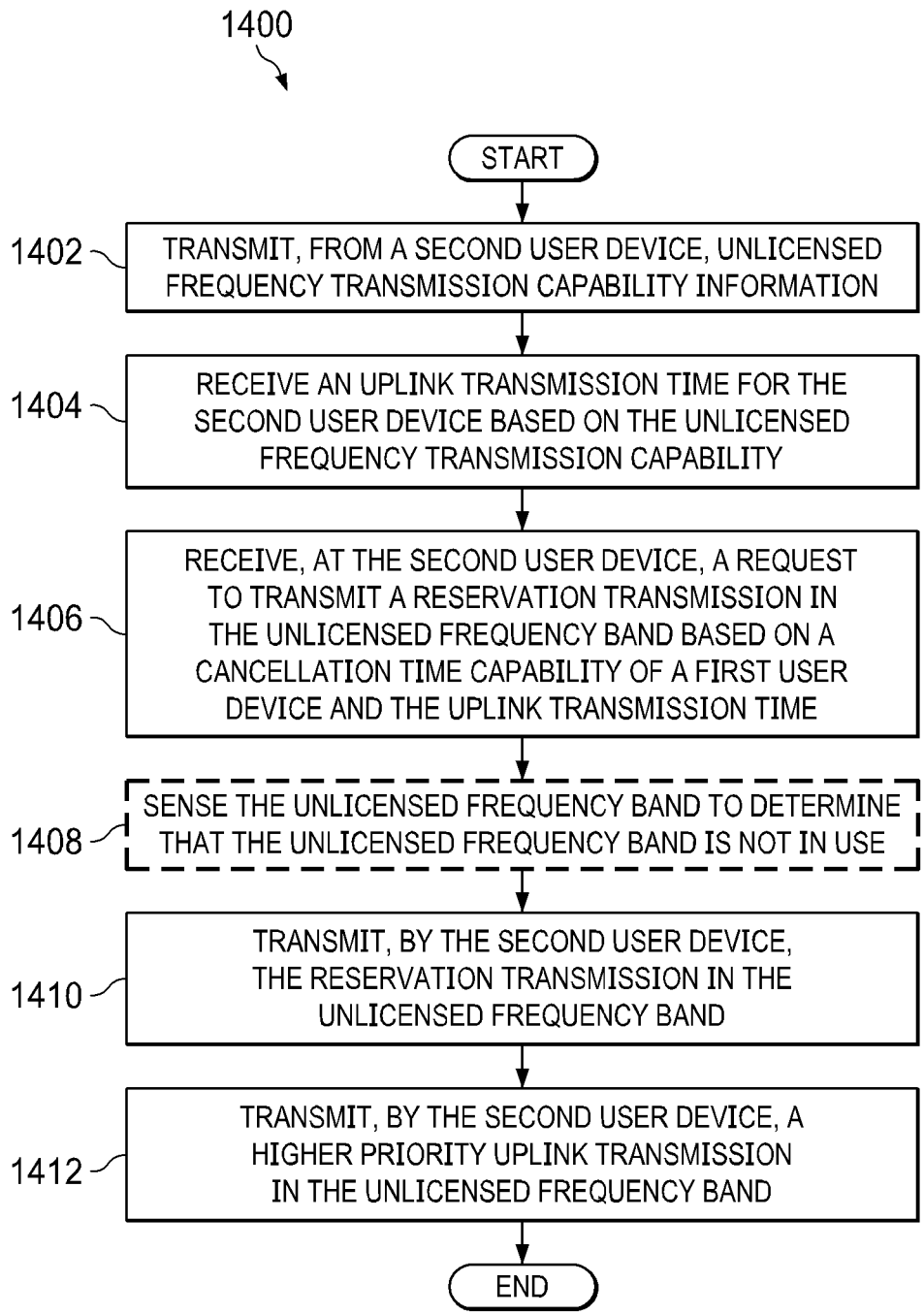
FIG. 14A is a flow diagram illustrating a technique for communications in a wireless system, in accordance with aspects of the present disclosure.

FIG. 14A is a flow diagram illustrating a technique 1400 for communications in a wireless system, in accordance with aspects of the present disclosure. At block 1402, a second user device transmits unlicensed frequency transmission capability information. At block 1404, an uplink transmission time is received for the second user device based on the unlicensed frequency transmission capability. At block 1406, the second user device receives a request to transmit a reservation transmission in an unlicensed frequency band based on a cancellation time capability of a first user device and the uplink transmission time. At block 1408, the second user device transmits the reservation transmission in the unlicensed frequency band. At block 1410, second user device transmits a higher priority uplink transmission in the unlicensed frequency band.

Figure 14B:
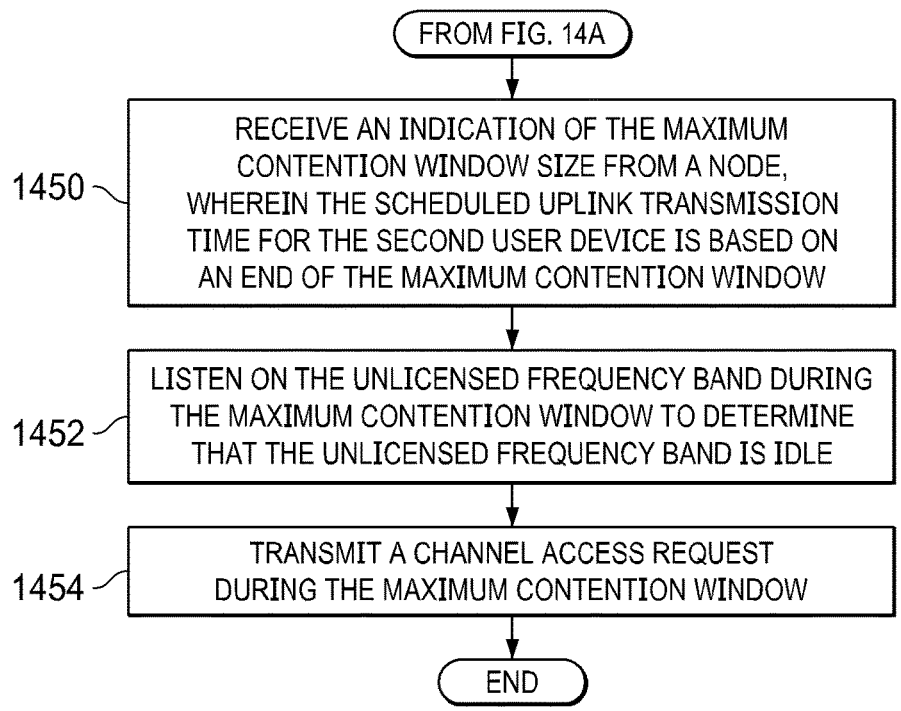
FIG. 14B is a flow diagram illustrating optional ways for communications in a wireless system, in accordance with aspects of the present disclosure.

FIG. 14B is a flow diagram illustrating optional ways for communications in a wireless system, in accordance with aspects of the present disclosure. At block 1450, an indication of a maximum contention window size is received from a node, wherein the uplink transmission time for the second user device is based on an end of the maximum contention window. At block 1452, listening may be performed on the unlicensed frequency band during the maximum contention window to determine that the unlicensed frequency band is idle. For example, the listening may be based on a randomly chosen amount of time within the maximum contention window, or may be a fixed amount of time. It may be understood that randomly chosen may refer to a number generated using any type of pseudo-random number generator. At block 1454, a reservation transmission is transmitted during the maximum contention window.

Figure 15:
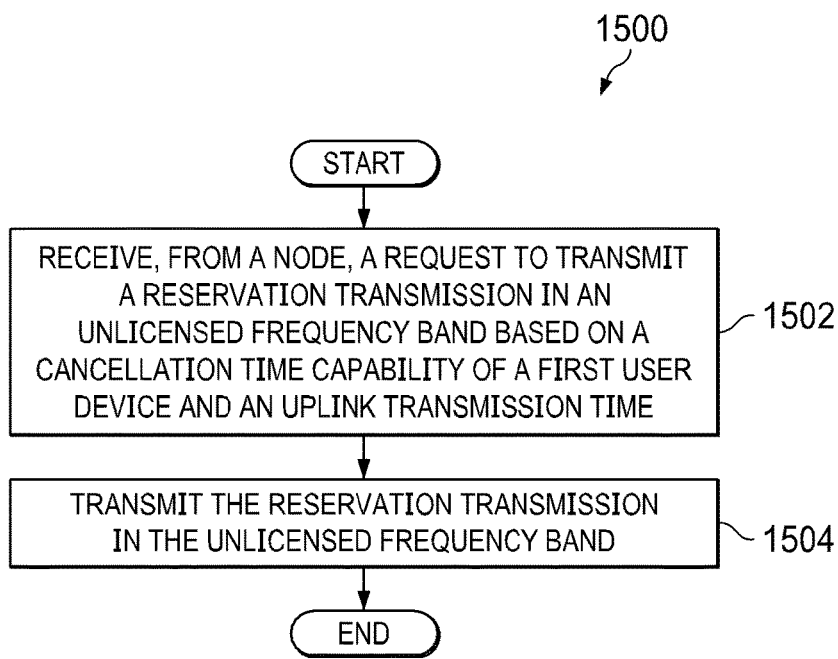
FIG. 15 is a flow diagram illustrating a technique for communications in a wireless system, in accordance with aspects of the present disclosure.

FIG. 15 is a flow diagram illustrating a technique 1500 for communications in a wireless system, in accordance with aspects of the present disclosure. At block 1502, a request to transmit a reservation transmission in an unlicensed frequency hand based on a cancellation time capability of a first user device and an uplink transmission time is received. At block 1504, the reservation transmission is transmitted in the unlicensed frequency band.

Figure 16:
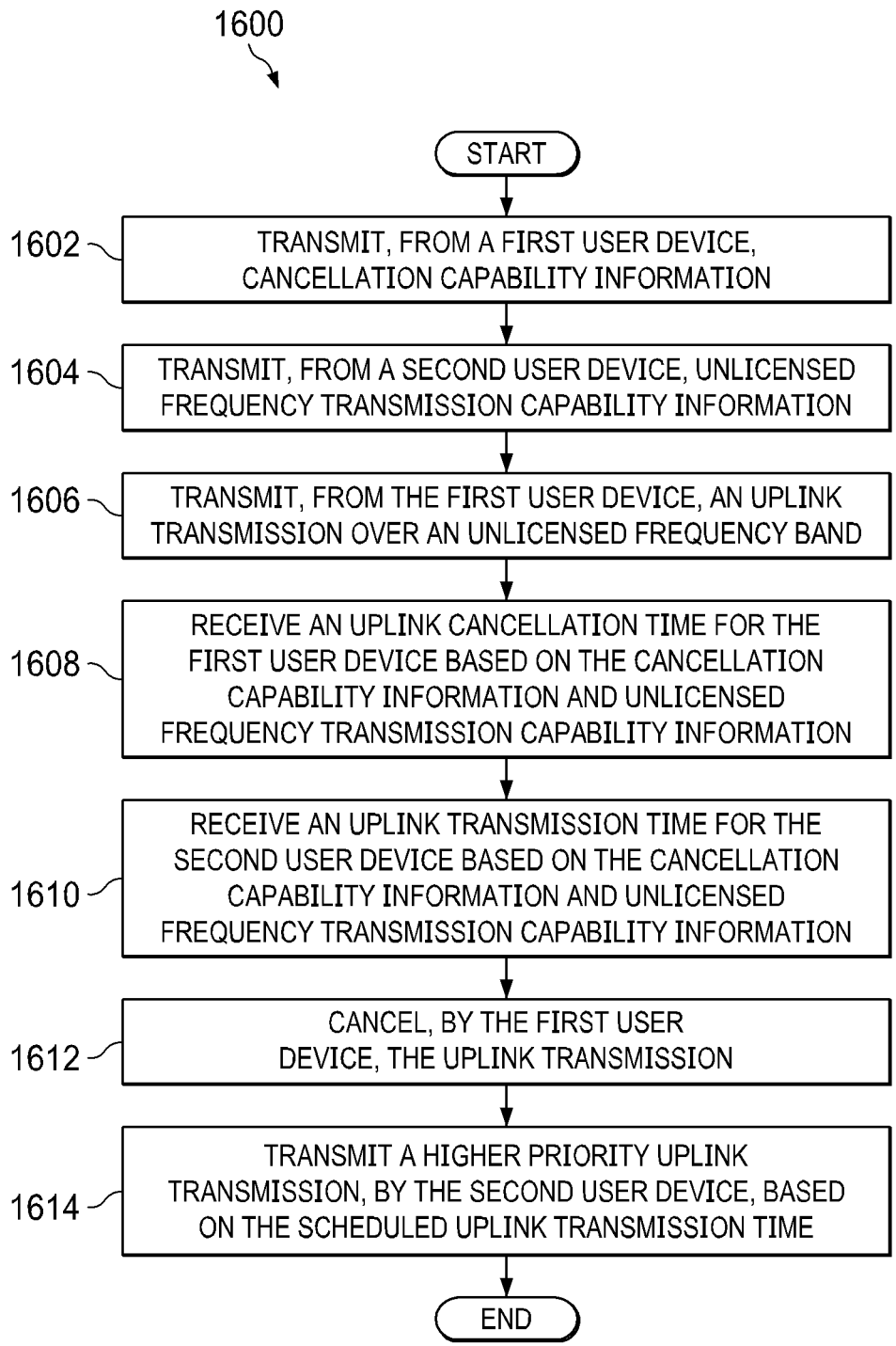
FIG. 16 is a flow diagram illustrating a technique for communications in a wireless system, in accordance with aspects of the present disclosure.

FIG. 16 is a flow diagram illustrating a technique 1600 for communications in a wireless system, in accordance with aspects of the present disclosure. At block 1602 a first user device transmits cancellation capability information. At block 1604, a second user device transmits unlicensed frequency transmission capability information. At block 1606, the first user device transmits an uplink transmission over an unlicensed frequency band. At block 1608, an uplink cancellation time is received for the first user device based on the cancellation capability information and unlicensed frequency transmission capability information. At block 1610, an uplink transmission time is received for the second user device based on the cancellation capability information and unlicensed frequency transmission capability information. At block 1612, the first user device cancels the uplink transmission. At block 1614, the a higher priority uplink transmission is transmitted by the second user device, based on the scheduled uplink transmission time.

EXAMPLES

In the following sections, further examples are provided.

According to example 1, a method for communications in a wireless system is disclosed, comprising: receiving, from a first user device, cancellation capability information; receiving, from a second user device, unlicensed frequency transmission capability information; receiving, from the first user device, an uplink transmission over an unlicensed frequency band; determining, a need for a higher priority uplink transmission by the second user device; scheduling an uplink cancellation time for the first user device based on the cancellation capability information and the unlicensed frequency transmission capability information; scheduling an uplink transmission time for the second user device based on the cancellation capability information and the unlicensed frequency transmission capability information; transmitting an uplink cancellation request to the first user device based on the scheduled uplink cancellation time; and transmitting an uplink transmission time for the higher priority uplink transmission to the second user device based on the scheduled uplink transmission time.

Example 2 comprises the subject matter of example 1, wherein the unlicensed frequency transmission capability information indicates that the second user device supports transmitting without sensing whether the unlicensed frequency band is in use, and wherein the uplink cancellation time is the same as the uplink transmission time.

Example 3 comprises the subject matter of example 2, wherein the cancellation capability information indicates that the first user device has a cancellation time capability equal to or less than a gap time period, and further comprising: scheduling a reservation transmission in the unlicensed frequency band based on the cancellation time capability and a sensing time of the sensing.

Example 4 comprises the subject matter of example 3, wherein the gap time period is based on a sensing interval, and wherein the scheduled uplink transmission time is after the gap time period.

Example 5 comprises the subject matter of example 1, wherein the unlicensed frequency transmission capability information indicates that the second user device supports transmitting without sensing that the unlicensed frequency band is in use, the sensing having a sensing time period, wherein the cancellation capability information indicates that the first user device has a cancellation time capability longer than a gap time period, and further comprising: scheduling a reservation transmission in the unlicensed frequency band based on the cancellation time capability and the uplink transmission time.

Example 6 comprises the subject matter of example 5, further comprising transmitting, to the second user device, an indication to transmit the reservation transmission, wherein the scheduled reservation transmission is before the uplink transmission time.

Example 7 comprises the subject matter of example 5, further comprising transmitting the reservation transmission, wherein the scheduled reservation transmission is before the uplink transmission time.

Example 8 comprises the subject matter of example 5, further comprising transmitting, to a third user device, an indication to transmit the reservation transmission, wherein the scheduled reservation transmission is before the uplink transmission time.

Example 9 comprises the subject matter of example 1-8, further comprising transmitting, to the second user device, an indication to transmit the higher priority uplink transmission without sensing the unlicensed frequency band is in use.

Example 10 comprises the subject matter of example 1, wherein unlicensed frequency transmission capability information indicates that the second user device supports transmitting after sensing whether the unlicensed frequency band is in use, the sensing having a sensing time period, wherein the cancellation capability information indicates that the first user device has a cancellation time capability shorter than the sensing time period, and wherein the uplink cancellation time is scheduled based on the sensing time period.

Example 11 comprises the subject matter of example 1, wherein unlicensed frequency transmission capability information indicates that the second user device supports transmitting after sensing that the unlicensed frequency band is in use, the sensing having a sensing time period, wherein the cancellation capability information indicates that the first user device has a cancellation time capability longer than the sensing time period, and further comprising: scheduling a reservation transmission in the unlicensed frequency band based on the cancellation time capability and the sensing time.

Example 12 comprises the subject matter of example 11, further comprising transmitting, to the second user device, an indication to transmit the reservation transmission during a time period of the cancellation time capability of the first user device.

Example 13 comprises the subject matter of example 11, further comprising transmitting the reservation transmission during a time period of the cancellation time capability of the first user device.

Example 14 comprises the subject matter of example 11, further comprising transmitting, to a third user device, an indication to transmit the reservation transmission during a time period of the cancellation time capability of the first user device.

Example 15 comprises the subject matter of example 10-14, further comprising transmitting, to the second user device, an indication to transmit the higher priority uplink transmission after sensing whether the unlicensed frequency band is in use.

Example 16 comprises the subject matter of example 1, further comprising: determining a maximum contention time window size based on the unlicensed frequency transmission capability information for the second user device; transmitting an indication of the maximum contention time window size to one or more user devices, the one or more user device including at least the second user device, wherein the scheduled the uplink transmission time for the second user device is based on an end of the maximum contention time window; and receiving a reservation transmission from a user device of the one or more user devices that acquires the unlicensed frequency band.

Example 17 comprises the subject matter of example 16, further comprising: determining a maximum contention time window size based on the unlicensed frequency transmission capability information for the second user device; transmitting an indication of the maximum contention time window to one or more user devices, the one or more user device including at least the second user device, wherein the scheduled the uplink transmission time for the second user device is based on an end of the maximum contention time window; scheduling a reservation transmission in the unlicensed frequency band based on a cancellation time capability; and receiving a reservation transmission from a user device of the one or more user devices that acquires the unlicensed frequency band.

Example 18 comprises the subject matter of example 17, further comprising transmitting, to the second user device, an indication to transmit the reservation transmission, wherein the scheduled reservation transmission is during the uplink cancellation time.

Example 19 comprises the subject matter of example 17, further comprising transmitting the reservation transmission, wherein the scheduled reservation transmission is during the uplink cancellation time.

Example 20 comprises the subject matter of example 17 further comprising transmitting, to a third user device, an indication to transmit the reservation transmission, wherein the scheduled reservation transmission during the uplink cancellation time.

Example 21 comprises the subject matter of example 1, wherein the uplink transmission time comprises an indication of a start time and duration of the higher priority data transmission.

Example 22 comprises the subject matter of any of examples 3-8, 11-14, or 16-20, wherein the request to transmit a reservation transmission comprises an indication of a start time and duration of the reservation transmission.

Example 23 comprises the subject matter of any of examples 3-8, 11-14, or 16-20, wherein the reservation transmission comprises a cyclic prefix encoded in a start and length indicator table.

Example 24 comprises the subject matter of any of examples 3-8, 11-14, or 16-20, wherein the reservation transmission comprises an encoded indication of a listen before talk type.

Example 25 comprises the subject matter of any of examples 3-8, 11-14, or 16-20, further comprising transmitting an indication of contents of the reservation transmission.

According to example 26, a device is disclosed, comprising: an antenna; a radio operably coupled to the antenna; and a processor operably coupled to the radio; wherein the device is configured to: receive, from a first user device, cancellation capability information; receive, from a second user device, unlicensed frequency transmission capability information; receive, from the first user device, an uplink transmission over an unlicensed frequency band; determine, a need for a higher priority uplink transmission by the second user device; schedule an uplink cancellation time for the first user device based on the cancellation capability information and the unlicensed frequency transmission capability information; schedule an uplink transmission time for the second user device based on the cancellation capability information and the unlicensed frequency transmission capability information; transmit an uplink cancellation request to the first user device based on the scheduled uplink cancellation time; and transmit an uplink transmission time for the higher priority uplink transmission to the second user device based on the scheduled uplink transmission time.

Example 27 comprises the subject matter of example 26, wherein the unlicensed frequency transmission capability information indicates that the second user device supports transmitting without sensing whether the unlicensed frequency band is in use, and wherein the uplink cancellation time is the same as the uplink transmission time.

Example 28 comprises the subject matter of example 27, wherein the cancellation capability information indicates that the first user device has a cancellation time capability equal to or less than a gap time period, and wherein the device is further configured to: schedule a reservation transmission in the unlicensed frequency band based on the cancellation time capability and a sensing time of the sensing.

Example 29 comprises the subject matter of example 28, wherein the gap time period is based on a sensing interval, and wherein the scheduled uplink transmission time is after the gap time period.

Example 30 comprises the subject matter of example 26, wherein the unlicensed frequency transmission capability information indicates that the second user device supports transmitting without sensing that the unlicensed frequency band is in use, the sensing having a sensing time period, wherein the cancellation capability information indicates that the first user device has a cancellation time capability longer than a gap time period, and wherein the device is further configured to: schedule a reservation transmission in the unlicensed frequency band based on the cancellation time capability and the uplink transmission time.

Example 31 comprises the subject matter of example 30, wherein the device is further configured to: transmit, to the second user device, an indication to transmit the reservation transmission, wherein the scheduled reservation transmission is before the uplink transmission time.

Example 32 comprises the subject matter of example 30, wherein the device is further configured to: transmit the reservation transmission, wherein the scheduled reservation transmission is before the uplink transmission time.

Example 33 comprises the subject matter of example 30, wherein the device is further configured to: transmit, to a third user device, an indication to transmit the reservation transmission, wherein the scheduled reservation transmission is before the uplink transmission time.

Example 34 comprises the subject matter of example 26, wherein unlicensed frequency transmission capability information indicates that the second user device supports transmitting after sensing whether the unlicensed frequency band is in use, the sensing having a sensing time period, wherein the cancellation capability information indicates that the first user device has a cancellation time capability shorter than the sensing time period, and wherein the uplink cancellation time is scheduled based on the sensing time period.

Example 35 comprises the subject matter of example 26, wherein unlicensed frequency transmission capability information indicates that the second user device supports transmitting after sensing that the unlicensed frequency band is in use, the sensing having a sensing time period, wherein the cancellation capability information indicates that the first user device has a cancellation time capability longer than the sensing time period, and wherein the device is further configured to: schedule a reservation transmission in the unlicensed frequency band based on the cancellation time capability and the sensing time.

Example 36 comprises the subject matter of example 35, wherein the device is further configured to transmit, to the second user device, an indication to transmit the reservation transmission during a time period of the cancellation time capability of the first user device.

Example 37 comprises the subject matter of example 35, wherein the device is further configured to transmit the reservation transmission during a time period of the cancellation time capability of the first user device.

Example 38 comprises the subject matter of example 35, wherein the device is further configured to transmit, to a third user device, an indication to transmit the reservation transmission during a time period of the cancellation time capability of the first user device.

Example 39 comprises the subject matter of example 26, wherein the device is further configured to: determine a maximum contention time window size based on the unlicensed frequency transmission capability information for the second user device; transmit an indication of the maximum contention time window size to one or more user devices, the one or more user device including at least the second user device, wherein the scheduled the uplink transmission time for the second user device is based on an end of the maximum contention time window; and receive a reservation transmission from a user device of the one or more user devices that acquires the unlicensed frequency band.

Example 40 comprises the subject matter of example 39, wherein the device is further configured to: determine a maximum contention time window size based on the unlicensed frequency transmission capability information for the second user device; transmit an indication of the maximum contention time window to one or more user devices, the one or more user device including at least the second user device, wherein the scheduled the uplink transmission time for the second user device is based on an end of the maximum contention time window; schedule a reservation transmission in the unlicensed frequency band based on a cancellation time capability; and receive a reservation transmission from a user device of the one or more user devices that acquires the unlicensed frequency band.

Example 41 comprises the subject matter of example 40, wherein the device is further configured to: transmit, to the second user device, an indication to transmit the reservation transmission, wherein the scheduled reservation transmission is during the uplink cancellation time.

Example 42 comprises the subject matter of example 40, wherein the device is further configured to: transmit the reservation transmission, wherein the scheduled reservation transmission is during the uplink cancellation time.

Example 43 comprises the subject matter of example 40, wherein the device is further configured to: transmit, to a third user device, an indication to transmit the reservation transmission, wherein the scheduled reservation transmission during the uplink cancellation time.

Example 44 comprises the subject matter of example 26, wherein the uplink transmission time comprises an indication of a start time and duration of the higher priority data transmission.

According to example 45, a method for communications in a wireless system is disclosed, comprising: transmitting, from a second user device, unlicensed frequency transmission capability information; receiving an uplink transmission time for the second user device based on the unlicensed frequency transmission capability; receiving, at the second user device, a request to transmit a reservation transmission in an unlicensed frequency band based on a cancellation time capability of a first user device and the uplink transmission time; transmitting, by the second user device, the reservation transmission in the unlicensed frequency band; and transmitting, by the second user device, a higher priority uplink transmission in the unlicensed frequency band.

Example 46 comprises the subject matter of example 45, further comprising: receiving, an indication to sense the unlicensed frequency band to determine whether the unlicensed frequency band is in use before transmitting the higher priority uplink transmission; and sensing the unlicensed frequency band to determine that the unlicensed frequency band is not in use before transmitting the higher priority uplink transmission.

Example 47 comprises the subject matter of example 45, further comprising: receiving, an indication to transmit the higher priority uplink transmission without sensing the unlicensed frequency band is in use.

Example 48 comprises the subject matter of example 45, further comprising: receiving an indication of a maximum contention window size from a node, wherein the uplink transmission time for the second user device is based on an end of the maximum contention window; listening on the unlicensed frequency band during the maximum contention window to determine that the unlicensed frequency band is idle; and transmitting a reservation transmission during the maximum contention window.

Example 49 comprises the subject matter of example 48, wherein the listening is based on a randomly chosen amount of time within the maximum contention window.

Example 50 comprises the subject matter of example 45, wherein the uplink transmission time comprises an indication of a start time and duration of the higher priority data transmission.

Example 51 comprises the subject matter of example 45, wherein the request to transmit a reservation transmission comprises an indication of a start time and duration of the reservation transmission.

Example 52 comprises the subject matter of example 45, wherein the reservation transmission comprises an extended cyclic prefix.

Example 53 comprises the subject matter of example 45, wherein the reservation transmission comprises one or more portions of a start and length indicator table.

Example 54 comprises the subject matter of example 45, wherein the reservation transmission comprises an encoded indication of a listen before talk type.

Example 55 comprises the subject matter of any of examples 45-54, further comprising receiving an indication of contents of the reservation transmission.

According to example 56, a method for communications in a wireless system is disclosed, comprising: receiving, from a node, a request to transmit a reservation transmission in an unlicensed frequency band based on a cancellation time capability of a first user device and an uplink transmission time; and transmitting the reservation transmission in the unlicensed frequency band.

Example 57 comprises the subject matter of example 56, wherein the request to transmit a reservation transmission comprises an indication of a start time and duration of the reservation transmission.

Example 58 comprises the subject matter of example 56, wherein the reservation transmission comprises a cyclic prefix encoded in a star and length indicator table.

Example 59 comprises the subject matter of example 56, wherein the reservation. transmission comprises an encoded indication of a listen before talk type.

Example 60 comprises the subject matter of any of examples 56-59, further comprising receiving an indication of contents of the reservation transmission.

According to example 61, a method for communications in a wireless system is disclosed, comprising: transmitting, from a first user device, cancellation capability information; transmitting, from a second user device, unlicensed frequency transmission capability information; transmitting, from the first user device, an uplink transmission over an unlicensed frequency band; receiving an uplink cancellation time for the first user device based on the cancellation capability information and unlicensed frequency transmission capability information; receiving an uplink transmission time for the second user device based on the cancellation capability information and unlicensed frequency transmission capability information; cancelling, by the first user device, the uplink transmission; and transmitting a higher priority uplink transmission, by the second user device, based on the scheduled uplink transmission time.

According to example 62, a wireless device is disclosed, comprising: an antenna; a radio operably coupled to the antenna; and a processor operably coupled to the radio; wherein the wireless device is configured to: transmit, from a second user device, unlicensed frequency transmission capability information; receive an uplink transmission time for the second user device based on the unlicensed frequency transmission capability; receive, at the second user device, a request to transmit a reservation transmission in an unlicensed frequency band based on a cancellation time capability of a first user device and the uplink transmission time; transmit, by the second user device, the reservation transmission in the unlicensed frequency band; and transmit, by the second user device, a higher priority uplink transmission in the unlicensed frequency band.

Example 63 comprises the subject matter of example 62, wherein the wireless device is further configured to: receive, an indication to sense the unlicensed frequency band to determine whether the unlicensed frequency band is in use before transmitting the higher priority uplink transmission; and sense the unlicensed frequency band to determine that the unlicensed frequency band is not in use before transmitting the higher priority uplink transmission.

Example 64 comprises the subject matter of example 62, wherein the wireless device is further configured to: receive, an indication to transmit the higher priority uplink transmission without sensing the unlicensed frequency band is in use.

Example 65 comprises the subject matter of example 62, wherein the wireless device is further configured to: receive an indication of a maximum contention window size from a node, wherein the uplink transmission time for the second user device is based on an end of the maximum contention window; listen on the unlicensed frequency band during the maximum contention window to determine that the unlicensed frequency band is idle; and transmit a reservation transmission during the maximum contention window.

Example 66 comprises the subject matter of example 65, wherein the listening is based on a randomly chosen amount of time within the maximum contention window.

Example 67 comprises the subject matter of example 62, wherein the uplink transmission time comprises an indication of a start time and duration of the higher priority data transmission.

Example 68 comprises the subject matter of example 62, wherein the request to transmit a reservation transmission comprises an indication of a start time and duration of the reservation transmission.

Example 69 comprises the subject matter of example 62, wherein the reservation transmission comprises an extended cyclic prefix.

Example 70 comprises the subject matter of example 62, wherein the reservation transmission comprises one or more portions of a start and length indicator table.

Example 71 comprises the subject matter of example 62, wherein the reservation transmission comprises an encoded indication of a listen before talk type.

Example 72 comprises the subject matter of any of examples 62-71, wherein the wireless device is further configured to receive an indication of contents of the reservation transmission.

According to example 73, a wireless device is disclosed, comprising: an antenna; a radio operably coupled to the antenna; and a processor operably coupled to the radio; wherein the wireless device is configured to: receive, from a node, a request to transmit a reservation transmission in an unlicensed frequency band based on a cancellation time capability of a first user device and an uplink transmission time; and transmit the reservation transmission in the unlicensed frequency band.

Example 74 comprises the subject matter of example 73, wherein the request to transmit a reservation transmission comprises an indication of a start time and duration of the reservation transmission.

Example 75 comprises the subject matter of example 73, wherein the reservation transmission comprises a cyclic prefix encoded in a start and length indicator table.

Example 76 comprises the subject matter of example 73, wherein the reservation transmission comprises an encoded indication of a listen before talk type.

Example 77 comprises the subject matter of any of examples 73-76, further comprising receiving an indication of contents of the reservation transmission.

Yet another exemplary embodiment may include a method, comprising: by a device:

performing any or all parts of the preceding examples.

A yet further exemplary embodiment may include a non-transitory computer-accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for communications in a wireless system, comprising:
   receiving, from a first user device, cancellation capability information;
   receiving, from a second user device, unlicensed frequency transmission capability information;
   receiving, from the first user device, an uplink transmission over an unlicensed frequency band;
   determining, a need for a higher priority uplink transmission by the second user device;
   scheduling an uplink cancellation time for the first user device based on the cancellation capability information and the unlicensed frequency transmission capability information;
   scheduling an uplink transmission time for the second user device based on the cancellation capability information and the unlicensed frequency transmission capability information;
   transmitting an uplink cancellation request to the first user device based on the scheduled uplink cancellation time; and
   transmitting an uplink transmission time for the higher priority uplink transmission to the second user device based on the scheduled uplink transmission time.

2. The method of claim 1, wherein the unlicensed frequency transmission capability information indicates that the second user device supports transmitting without sensing whether the unlicensed frequency band is in use, and wherein the uplink cancellation time is the same as the uplink transmission time.

3. The method of claim 2, wherein the cancellation capability information indicates that the first user device has a cancellation time capability equal to or less than a gap time period, and further comprising:
   scheduling a reservation transmission in the unlicensed frequency band based on the cancellation time capability and a sensing time of the sensing.

4. The method of claim 1, wherein the unlicensed frequency transmission capability information indicates that the second user device supports transmitting without sensing that the unlicensed frequency band is in use, the sensing having a sensing time period, wherein the cancellation capability information indicates that the first user device has a cancellation time capability longer than a gap time period, and further comprising:
   scheduling a reservation transmission in the unlicensed frequency band based on the cancellation time capability and the uplink transmission time.

5. The method of claim 4, further comprising transmitting, to the second user device, an indication to transmit the reservation transmission, wherein the scheduled reservation transmission is before the uplink transmission time.

6. The method of claim 4, further comprising transmitting the reservation transmission, wherein the scheduled reservation transmission is before the uplink transmission time.

7. The method of claim 4, further comprising transmitting, to a third user device, an indication to transmit the reservation transmission, wherein the scheduled reservation transmission is before the uplink transmission time.

8. The method of claim 1, wherein unlicensed frequency transmission capability information indicates that the second user device supports transmitting after sensing whether the unlicensed frequency band is in use, the sensing having a sensing time period, wherein the cancellation capability information indicates that the first user device has a cancellation time capability shorter than the sensing time period, and wherein the uplink cancellation time is scheduled based on the sensing time period.

9. The method of claim 1, wherein unlicensed frequency transmission capability information indicates that the second user device supports transmitting after sensing that the unlicensed frequency band is in use, the sensing having a sensing time period, wherein the cancellation capability information indicates that the first user device has a cancellation time capability longer than the sensing time period, and further comprising:
scheduling a reservation transmission in the unlicensed frequency band based on the cancellation time capability and the sensing time.

10. The method of claim 9, further comprising transmitting, to the second user device, an indication to transmit the reservation transmission during a time period of the cancellation time capability of the first user device.

11. The method of claim 9, further comprising transmitting the reservation transmission during a time period of the cancellation time capability of the first user device.

12. The method of claim 9, further comprising transmitting, to a third user device, an indication to transmit the reservation transmission during a time period of the cancellation time capability of the first user device.

13. The method of claim 1, further comprising:
determining a maximum contention time window size based on the unlicensed frequency transmission capability information for the second user device;
transmitting an indication of the maximum contention time window size to one or more user devices, the one or more user device including at least the second user device, wherein the scheduled the uplink transmission time for the second user device is based on an end of the maximum contention time window; and
receiving a reservation transmission from a user device of the one or more user devices that acquires the unlicensed frequency band.

14. The method of claim 13, further comprising:
determining a maximum contention time window size based on the unlicensed frequency transmission capability information for the second user device;
transmitting an indication of the maximum contention time window to one or more user devices, the one or more user device including at least the second user device, wherein the scheduled the uplink transmission time for the second user device is based on an end of the maximum contention time window;
scheduling a reservation transmission in the unlicensed frequency band based on a cancellation time capability; and
receiving a reservation transmission from a user device of the one or more user devices that acquires the unlicensed frequency band.

15. A device comprising:
an antenna;
a radio operably coupled to the antenna; and
a processor operably coupled to the radio;
wherein the device is configured to:
receive, from a first user device, cancellation capability information;
receive, from a second user device, unlicensed frequency transmission capability information;
receive, from the first user device, an uplink transmission over an unlicensed frequency band;
determine, a need for a higher priority uplink transmission by the second user device;
schedule an uplink cancellation time for the first user device based on the cancellation capability information and the unlicensed frequency transmission capability information;
schedule an uplink transmission time for the second user device based on the cancellation capability information and the unlicensed frequency transmission capability information;
transmit an uplink cancellation request to the first user device based on the scheduled uplink cancellation time; and
transmit an uplink transmission time for the higher priority uplink transmission to the second user device based on the scheduled uplink transmission time.

16. The device of claim 15, wherein the unlicensed frequency transmission capability information indicates that the second user device supports transmitting without sensing whether the unlicensed frequency band is in use, and wherein the uplink cancellation time is the same as the uplink transmission time.

17. The device of claim 16, wherein the cancellation capability information indicates that the first user device has a cancellation time capability equal to or less than a gap time period, and wherein the device is further configured to:
schedule a reservation transmission in the unlicensed frequency band based on the cancellation time capability and a sensing time of the sensing.

18. The device of claim 17, wherein the gap time period is based on a sensing interval, and wherein the scheduled uplink transmission time is after the gap time period.

19. The device of claim 15, wherein the unlicensed frequency transmission capability information indicates that the second user device supports transmitting without sensing that the unlicensed frequency band is in use, the sensing having a sensing time period, wherein the cancellation capability information indicates that the first user device has a cancellation time capability longer than a gap time period, and wherein the device is further configured to:
schedule a reservation transmission in the unlicensed frequency band based on the cancellation time capability and the uplink transmission time.

20. An integrated circuit, comprising circuitry configured to cause a wireless device to
receive, from a first user device, cancellation capability information;
receive, from a second user device, unlicensed frequency transmission capability information;
receive, from the first user device, an uplink transmission over an unlicensed frequency band;
determine, a need for a higher priority uplink transmission by the second user device;
schedule an uplink cancellation time for the first user device based on the cancellation capability information and the unlicensed frequency transmission capability information;
schedule an uplink transmission time for the second user device based on the cancellation capability information and the unlicensed frequency transmission capability information;
transmit an uplink cancellation request to the first user device based on the scheduled uplink cancellation time; and transmit an uplink transmission time for the higher priority uplink transmission to the second user device based on the scheduled uplink transmission time.

\* \* \* \* \*